(12) United States Patent
Park et al.

(10) Patent No.: US 11,240,662 B2
(45) Date of Patent: Feb. 1, 2022

(54) ELECTRONIC DEVICE AND METHOD BY WHICH ELECTRONIC DEVICE TRANSMITS AND RECEIVES AUTHENTICATION INFORMATION

(71) Applicant: Samsung Electronics Co., Ltd., Gyeonggi-do (KR)

(72) Inventors: Chun-Ho Park, Seoul (KR); Jun-Sik Kwon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 191 days.

(21) Appl. No.: 16/605,337

(22) PCT Filed: Apr. 12, 2018

(86) PCT No.: PCT/KR2018/004290
§ 371 (c)(1),
(2) Date: Oct. 15, 2019

(87) PCT Pub. No.: WO2018/190650
PCT Pub. Date: Oct. 18, 2018

(65) Prior Publication Data
US 2021/0127262 A1    Apr. 29, 2021

(30) Foreign Application Priority Data

Apr. 14, 2017 (KR) ........................ 10-2017-0048619

(51) Int. Cl.
| | | |
|---|---|---|
| *H04B 7/00* | (2006.01) | |
| *H04W 12/06* | (2021.01) | |
| *H04W 4/80* | (2018.01) | |
| *H04W 12/50* | (2021.01) | |
| *H04W 88/06* | (2009.01) | |

(52) U.S. Cl.
CPC ............ *H04W 12/06* (2013.01); *H04W 4/80* (2018.02); *H04W 12/50* (2021.01); *H04W 88/06* (2013.01)

(58) Field of Classification Search
CPC ....... H04W 12/06; H04W 4/80; H04W 12/50; H04W 88/06
(Continued)

(56) References Cited

U.S. PATENT DOCUMENTS 9,805,733 B2 * 10/2017 Park .................. G10L 21/00
10,104,089 B2 * 10/2018 Kim .................. H04L 63/08
(Continued)

FOREIGN PATENT DOCUMENTS

| KR | 1020080039153 | 5/2008 |
|---|---|---|
| KR | 1020090073042 | 7/2009 |

(Continued)

OTHER PUBLICATIONS

PCT/ISA/210 Search Report issued on PCT/KR2018/004290, pp. 5.
PCT/ISA/237 Written Opinion issued on PCT/KR2018/004290, pp. 8.

*Primary Examiner* — April G Gonzales
(74) *Attorney, Agent, or Firm* — The Farrell Law Firm, P.C.

(57) ABSTRACT

Various embodiments related to an electronic device and a method by which the electronic device transmits and receives authentication information are presented, and according to one embodiment, the electronic device comprises: a first wireless communication circuit for supporting a Bluetooth protocol; a second wireless communication circuit for supporting a cellular wireless protocol; a third wireless communication circuit for supporting near field communication (NFC); a fourth wireless communication circuit for supporting a WiFi protocol; a camera exposed through a second part of a housing; a processor arranged in the housing and electrically connected to a display, the first wireless communication circuit, the second wireless communication circuit, the third wireless communication circuit, the fourth wireless communication circuit, and the camera;

(Continued)

and a memory arranged in the housing and electrically connected to the processor, wherein the memory can store instructions for causing, during execution thereof, the processor to acquire information relating to authentication for pairing with a first external electronic device on the basis of the Bluetooth protocol by using the third wireless communication circuit or the camera, perform pairing with the first external electronic device on the basis of at least a portion of the information by using the first wireless communication circuit, and transmit at least a portion of the information to a second external electronic device or a server by using the second wireless communication circuit or the fourth wireless communication circuit.

15 Claims, 11 Drawing Sheets

(58) Field of Classification Search
    USPC .................................................... 455/41.1
    See application file for complete search history.

(56) References Cited

U.S. PATENT DOCUMENTS

| | | | | |
|---|---|---|---|---|
| 10,149,161 | B2* | 12/2018 | Choi | H04L 63/0853 |
| 2009/0061769 | A1* | 3/2009 | Zimbric | H04M 1/72412 |
| | | | | 455/41.2 |
| 2009/0167486 | A1* | 7/2009 | Shah | G06F 21/35 |
| | | | | 340/5.2 |
| 2011/0210820 | A1* | 9/2011 | Talty | H04W 12/06 |
| | | | | 340/5.8 |
| 2014/0128031 | A1* | 5/2014 | Park | H04L 67/18 |
| | | | | 455/411 |
| 2014/0179276 | A1* | 6/2014 | Kang | H04W 12/50 |
| | | | | 455/411 |
| 2015/0133051 | A1* | 5/2015 | Jamal-Syed | H04W 4/21 |
| | | | | 455/41.2 |
| 2015/0237460 | A1* | 8/2015 | Goyal | G01D 11/00 |
| | | | | 455/41.2 |
| 2015/0237461 | A1* | 8/2015 | Goyal | H01Q 1/40 |
| | | | | 455/41.2 |
| 2015/0359022 | A1* | 12/2015 | Lau | H04W 76/14 |
| | | | | 455/41.2 |

FOREIGN PATENT DOCUMENTS

| | | |
|---|---|---|
| KR | 1020090100112 | 9/2009 |
| KR | 1020100057721 | 6/2010 |
| KR | 1020100058516 | 6/2010 |
| KR | 1020140083850 | 7/2014 |
| KR | 1020150039937 | 4/2015 |
| KR | 101581693 | 1/2016 |
| WO | WO 2016080798 | 5/2016 |

* cited by examiner

ELECTRONIC DEVICE AND METHOD BY WHICH ELECTRONIC DEVICE TRANSMITS AND RECEIVES AUTHENTICATION INFORMATION

PRIORITY

This application is a National Phase Entry of International Application No. PCT/KR2018/004290, which was filed on Apr. 12, 2018, and claims priority to Korean Patent Application No. 10-2017-0048619, which was filed on Apr. 14, 2017, the content of each of which is incorporated herein by reference.

TECHNICAL FIELD

Various embodiments of the present disclosure relate to an electronic device using short-range wireless communication.

BACKGROUND ART

Along with the development of communication technology, various wireless communication schemes are used between devices. Short-range communication techniques are popular, in which information is exchanged between interconnected portable devices such as a portable phone, a laptop computer, an earphone, and a speaker.

One of short-range communication standards, Bluetooth is not sensitive to walls or obstacles, compared to wireless local area network (WLAN). Thus, Bluetooth advantageously has a high data rate, is not directional, does not need to maintain directionality like a TV remote, and offers excellent security due to separate transmission of data in a plurality of frequencies.

Bluetooth 4.0 is a standard covering legacy Bluetooth, high-speed transmission (+HS), and low energy. The technology beyond Bluetooth 4.0 includes Bluetooth low energy (BLE). BLE, which is also called "Bluetooth Smart", enables low-power, low-capacity data transmission and reception in a 2.4 GHz frequency band with a propagation range of about 10 m. The most distinctive feature of BLE is a duty cycle of several ms and hence very low power consumption due to sleep mode most of the time. BLE is very feasible for ultra-small Internet of things (IoT) devices limited in power supply, and thus widely used in watches, toys, beacons, wearable computers (wearable devices), and so on. Bluetooth-enabled electronic devices may be connected 1:1 by a pairing procedure. For example, two Bluetooth-enabled electronic devices act as a master and a slave, respectively and are connected to each other by pairing. When the electronic devices are successfully paired, they may transmit and receive voice or data between them.

DETAILED DESCRIPTION OF THE INVENTION

Technical Problem

For authentication during a pairing procedure between electronic devices, a communication scheme other than Bluetooth, out of band (OOB) may be used. For example, OOB may be a short-range data exchange scheme other than Bluetooth, such as near field communication (NFC) tagging, camera-based quick response (QR) code recognition, Wireless Fidelity (WiFi) Direct, sound-based communication, or light-based communication.

In OOB, authentication may be performed by using OOB authentication data. OOB authentication data used in OOB pairing is for one-time use only. Therefore, an electronic device may neither reuse OOB authentication data nor share the OOB authentication data with another device.

Various embodiments of the present disclosure may provide an electronic device which obtains OOB authentication data from a first external electronic device and shares the obtained OOB authentication data with at least one second external electronic device belonging to the same account or group, such that the at least one second external electronic device may perform Bluetooth-based pairing with the first external electronic device by using the shared OOB authentication data, and a method of transmitting and receiving authentication data in the electronic device.

Various embodiments of the present disclosure may provide an electronic device which manages shared OOB authentication data to be used only during a predetermined time or only a predetermined number of times by setting a valid duration or a valid connection number for the OOB authentication data shared between an electronic device and at least one external electronic device which belong to the same account or group, and a method of transmitting and receiving authentication data in the electronic device.

Technical Solution

According to various embodiments, an electronic device may include a housing, a touch screen display exposed through a first part of the housing, a first wireless communication circuit supporting a Bluetooth protocol, a second wireless communication circuit supporting a cellular wireless protocol, a third wireless communication circuit supporting near field communication (NFC), a fourth wireless communication circuit supporting a wireless fidelity (WiFi) protocol, a camera exposed through a second part of the housing, a processor disposed inside the housing, and electrically coupled to the display, the first wireless communication circuit, the second wireless communication circuit, the third wireless communication circuit, the fourth wireless communication circuit, and the camera, and a memory disposed inside the housing and electrically coupled to the processor. The memory may store instructions which, when executed, cause the processor to obtain information related to authentication for pairing based on the Bluetooth protocol with a first external electronic device by using one of the third wireless communication circuit and the camera, to perform pairing with the first external electronic device based on at least part of the information by using the first wireless communication circuit, and to transmit the at least part of the information to a second external electronic device or a server by using the second wireless communication circuit or the fourth wireless communication circuit.

According to various embodiments, an electronic device may include a housing, a touch screen display exposed through a first part of the housing, a first wireless communication circuit supporting a Bluetooth protocol, a second wireless communication circuit supporting a cellular wireless protocol, a third wireless communication circuit supporting NFC, a fourth wireless communication circuit supporting a WiFi protocol, a camera exposed through a second part of the housing, a processor disposed inside the housing, and electrically coupled to the display, the first wireless communication circuit, the second wireless communication circuit, the third wireless communication circuit, the fourth wireless communication circuit, and the camera, and a memory disposed inside the housing and electrically coupled to the processor. The memory may store instructions which, when executed, cause the processor to connect the electronic device communicably to a server or a second external electronic device through the second wireless communication circuit or the fourth wireless communication circuit by using an account related to the electronic device, to receive information related to authentication for pairing based on the Bluetooth protocol with a first external electronic device from the server or the second external electronic device through the second wireless communication circuit or the fourth wireless communication circuit, and to perform pairing with the first external electronic device based on at least part of the information by using the first wireless communication circuit.

According to various embodiments, a method of transmitting authentication information in an electronic device may include obtaining information related to authentication for pairing based on a Bluetooth protocol with a first external electronic device, performing Bluetooth pairing with the first external electronic device based on at least part of the information, and transmitting the at least part of the information to a second external electronic device or a server to enable the second external electronic device to perform pairing based on the Bluetooth protocol with the first external electronic device by using the at least part of the information.

According to various embodiments, a method of receiving authentication information in an electronic device may include connecting communicably to a server or a second external electronic device by using an account related to the electronic device through a wireless communication circuit, receiving information related to authentication for pairing based on a Bluetooth protocol with a first external electronic device from the server or the second external electronic device through the wireless communication circuit, and performing Bluetooth pairing with the first external electronic device based on at least part of the information.

Advantageous Effects

According to various embodiments, as an electronic device is paired with a first external electronic device by using Bluetooth-based OOB authentication data and then shares the obtained OOB authentication data with at least one second external electronic device belonging to the same account or group, the second external electronic device does not need to separately obtain the authentication data.

According to various embodiments, as an electronic device transmits OOB authentication data available for Bluetooth pairing with a first external electronic device to a server and allows at least two other electronic devices belonging to the same account or group as the electronic device to receive the OOB authentication data from the server, the electronic device may share the OOB authentication data with at least one second external electronic device belonging to the same account or group.

According to various embodiments, security may be provided by setting a valid duration or a valid connection number for OOB authentication data shared between an electronic device and at least one external electronic device which belong to the same account or group.

MODE FOR CARRYING OUT THE INVENTION

Figure 1:
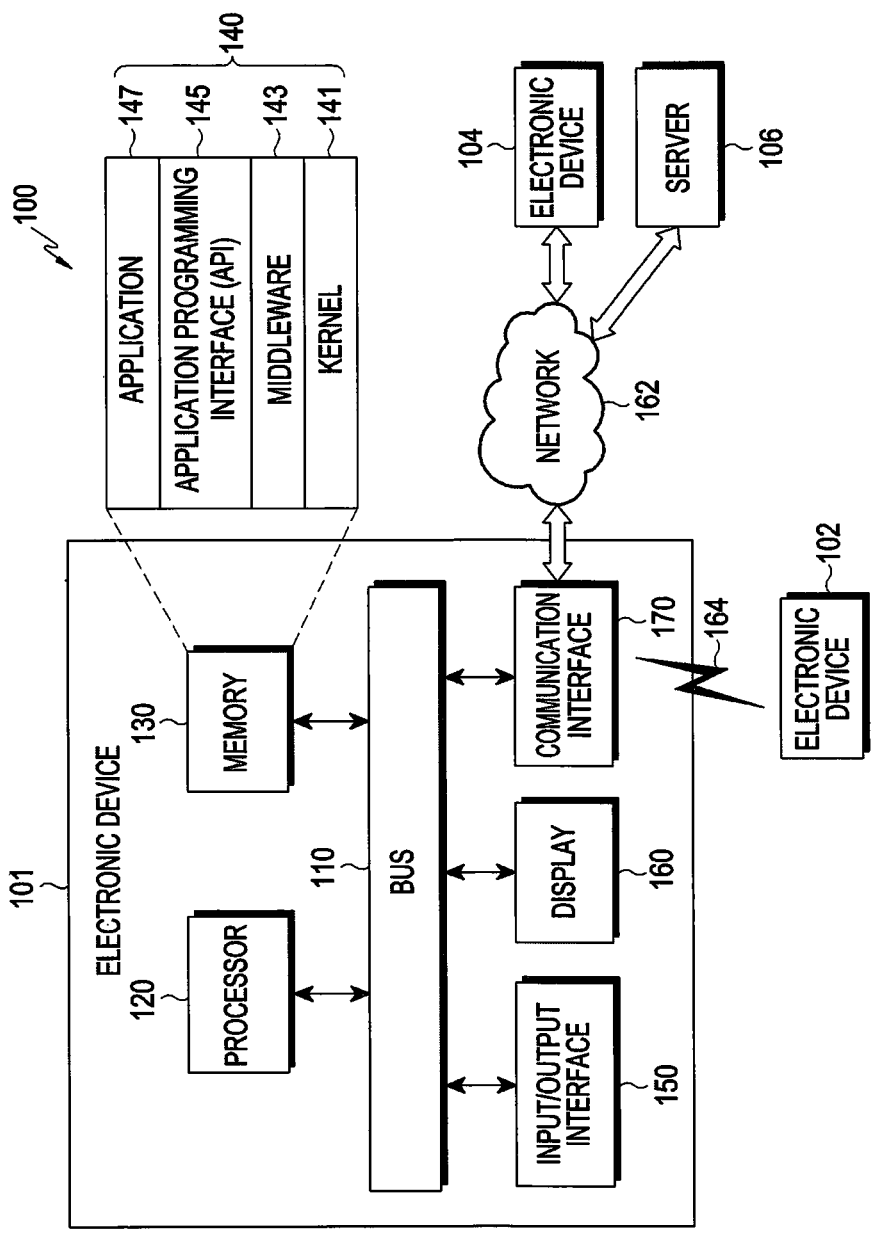
FIG. 1 is a block diagram of a network environment including an electronic device according to various embodiments of the present disclosure.

Various embodiments of the present disclosure are described with reference to the accompanying drawings. However, the embodiments and terms used herein are not intended to be limit the scope of the disclosure, and it is to be understood that the present disclosure covers various modifications, equivalents, and/or alternatives. With regard to the description of the drawings, similar reference numerals may be used to refer to similar elements. It is to be understood that singular forms include plural referents unless the context clearly dictates otherwise. As used herein, each of such phrases as "A or B" or "at least one of A and/or B" may include all possible combinations of the items enumerated together in a corresponding one of the phrases. The term as used in the present disclosure, "$1^{st}$", "first" or "second" may be used for the names of various components irrespective of sequence or importance, not limiting the components. These expressions are used to distinguish one component from another component. When it is said that a component (e.g., a first component) is "(operatively or communicatively) coupled with/to" or "connected to" another component (e.g., a second component), it should be understood that the one component is connected to the other component directly or through any other component (e.g., a third component).

The term "configured to" as used herein may be interchangeably used with, for example, the term "suitable for", "having the capacity to", "designed to", "adapted to", "made to", or "capable of" in hardware or software under circumstances. Under some circumstances, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations by executing one or more software programs stored in a memory device.

An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, medical equipment, a camera, or a wearable device. The wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad or tattoo), or an implantable circuit. According to some embodiments, an electronic device may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a media box (e.g., Samsung HomeSync™, Apple or Google TV™), a game console (e.g., Xbox™ or PlayStation™), an electronic dictionary, an electronic key, a camcorder, or an electronic picture frame.

According to other embodiments, an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller's machine (ATM) in a financial facility, a point of sales (POS) device in a shop, or an Internet of things device (e.g., a lighting bulb, various sensors, a sprinkler, a fire alarm, a thermostat, a street lamp, a toaster, sporting goods, a hot water tank, a heater, a boiler, or the like). According to some embodiments, an electronic device may include at least one of furniture, part of a building/structure or a vehicle, an electronic board, an electronic signature receiving device, a projector, or various measuring devices (e.g., a water, electricity, gas or electromagnetic wave measuring device). According to various embodiments, an electronic device may be flexible or one or a combination of two or more of the foregoing devices. An electronic device according to an embodiment of the disclosure may not be limited to the foregoing devices. In the disclosure, the term user may refer to a person or device (e.g., artificial intelligence electronic device) that uses an electronic device.

Referring to FIG. 1, an electronic device 101 in a network environment 100 according to various embodiments is described. The electronic device 101 may include a bus 110, a processor 120, a memory 130, an input/output (I/O) interface 150, a display 160, and a communication interface 170. In some embodiments, at least one of the components may be omitted in the electronic device 101 or a component may be added to the electronic device 101. The bus 110 may interconnect the foregoing components 110 to 170, and include a circuit which allows communication (e.g., transmission of control messages or data) between the foregoing components. The processor 120 may include one or more of a CPU, an application processor (AP), or a communication processor (CP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component of the electronic device 101. According to an embodiment, the memory 130 may store software and/or a program 140. The program 140 may include, for example, a kernel 141, middleware 143, an application programming interface (API) 145, and/or an application program (or "application") 147. At least a part of the kernel 141, the middleware 143, or the API 145 may be called an operating system (OS). The kernel 141 may control or manage system resources (e.g., the bus 110, the processor 120, or the memory 130) that are used in executing operations or functions implemented in other programs (e.g., the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data. Also, the middleware 143 may process one or more task requests received from the application programs 147 according to priority levels. For example, the middleware 143 may assign priority levels for using system resources (e.g., the bus 110, the processor 120, or the memory 130) of the electronic device 101 to at least one of the application programs 147, and process the one or more task requests according to the priority levels. The API 145 is an interface through which the application programs 147 control functions provided by the kernel 141 or the middleware 143. For example, the API 145 may include at least one interface or function (e.g., a command) for file control, window control, video processing, or text control. The I/O interface 150 may output a command or data received from the user or an external device to the other component(s) of the electronic device 101. Further, the I/O interface 150 may output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (e.g., text, an image, a video, an icon, and/or a symbol) to the user. The display 160 may include a touch screen and receive, for example, a touch input, a gesture input, a proximity input, or a hovering input through an electronic pen or a user's body part. The communication interface 170 may establish communication, for example, between the electronic device 101 and an external device (e.g., a first external electronic device 102, a second external electronic device 104, or a server 106). For example, the communication interface 170 may be connected to a network 162 by wireless communication or wired communication and communicate with the external device (e.g., the second external electronic device 104 or the server 106) over the network 162.

The wireless communication may include cellular communication using, for example, at least one of long-term evolution (LTE), LTE-Advanced (LTE-A), code division multiple access (CDMA), wideband CDMA (WCDMA), universal mobile telecommunication system (UMTS), Wireless Broadband (WiBro), or global system for mobile communications (GSM). According to an embodiment, the wireless communication may include, for example, as indicated by reference numeral 164, at least one of, for example, wireless fidelity (WiFi), light fidelity (LiFi), Bluetooth, Bluetooth low energy (BLE), Zigbee, near field communication (NFC), magnetic secure transmission (MST), radio frequency (RF), or body area network (BAN). According to an embodiment, the wireless communication may include global navigation satellite system (GNSS). GNSS may be, for example, global positioning system (GPS), global navigation satellite system (Glonass), Beidou navigation satellite system (hereinafter, referred to as "Beidou"), or Galileo, the European global satellite-based navigation system. In the disclosure, the terms "GPS" and "GNSS" are interchangeably used with each other. The wired communication may include, for example, at least one of universal serial bus (USB), high definition multimedia interface (HDMI), recommended standard 232 (RS-232), power line communication, or plain old telephone service (POTS). The network 162 may be a telecommunication network, for example, at least one of a computer network (e.g., LAN or WAN), the Internet, or a telephone network.

Each of the first and second external electronic devices 102 and 104 may be of the same type as or a different type from the electronic device 101. According to various embodiments, all or a part of operations performed in the electronic device 101 may be performed in one or more other electronic devices (e.g., the electronic devices 102 and 104) or the server 106. According to an embodiment, if the electronic device 101 is to perform a function or a service automatically or upon request, the electronic device 101 may request at least a part of functions related to the function or the service to another device (e.g., the electronic device 102 or 104 or the server 106), instead of performing the function or the service autonomously, or additionally. The other electronic device (e.g., the electronic device 102 or 104 or the server 106) may execute the requested function or an additional function, and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
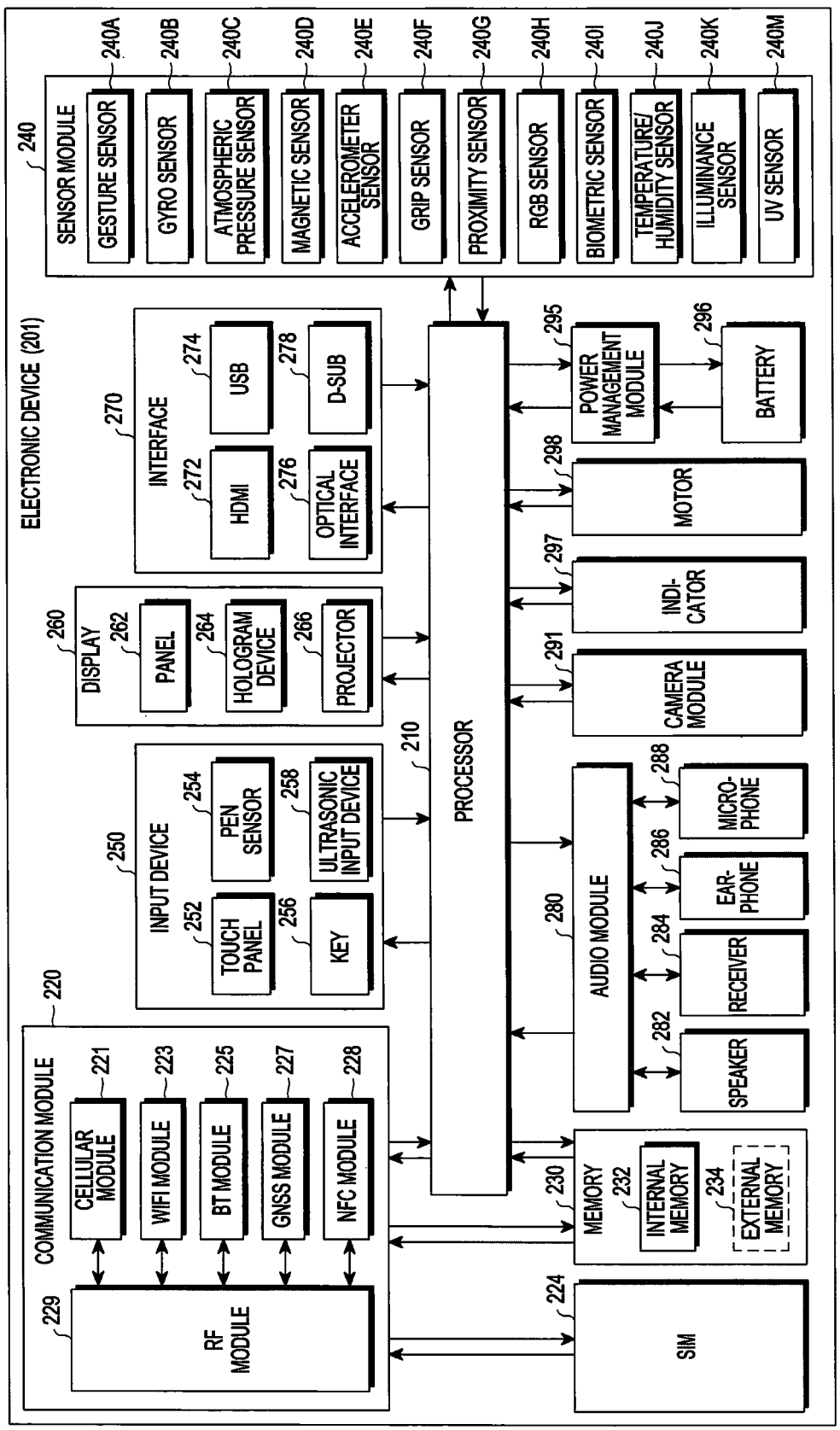
FIG. 2 is a block diagram of an electronic device according to various embodiments.

FIG. 2 is a block diagram of an electronic device according to various embodiments.

An electronic device 201 may include, for example, the whole or part of the electronic device 101 illustrated in FIG. 1. The electronic device 201 may include at least one processor (e.g., AP) 210, a communication module 220, a memory 230, a sensor module 240, an input device 250, a display 260, a subscriber identification module (SIM) 224, an interface 270, an audio module 280, a camera module 291, a power management module 295, a battery 296, an indicator 297, and a motor 298. The processor 210 may, for example, control a plurality of hardware or software components which are connected to the processor 210 by executing an OS or an application program, and may perform processing of various types of data or computations. The processor 210 may be implemented, for example, as a system on chip (SoC). According to an embodiment, the processor 210 may further include a graphic processing unit (GPU) and/or an image signal processor. The processor 210 may include at least a part (e.g., a cellular module 221) of the components illustrated in FIG. 2. The processor 210 may load a command or data received from at least one of other components (e.g., a non-volatile memory), process the loaded command or data, and store various types of data in the non-volatile memory.

The communication module 220 may have the same configuration as or a similar configuration to the communication interface 170. The communication module 220 may include, for example, the cellular module 221, a WiFi module 223, a Bluetooth module 225, a GNSS module 227, an NFC module 228, or an RF module 229. The cellular module 221 may provide services such as voice call, video call, text service, or the Internet service, for example, through a communication network. According to an embodiment, the cellular module 221 may identify and authenticate the electronic device 201 within a communication network, using the SIM (e.g., a SIM card) 224. According to an embodiment, the cellular module 221 may perform at least a part of the functions of the processor 210. According to an embodiment, the cellular module 221 may include a CP. According to some embodiments, at least a part (e.g., two or more) of the cellular module 221, the WiFi module 223, the Bluetooth module 225, the GNSS module 227, or the NFC module 228 may be included in a single integrated chip (IC) or IC package. The RF module 229 may transmit and receive, for example, communication signals (e.g., RF signals). The RF module 229 may include, for example, a transceiver, a power amplifier module (PAM), a frequency filter, a low noise amplifier (LNA), an antenna, or the like. According to another embodiment, at least one of the cellular module 221, the WiFi module 223, the Bluetooth module 225, the GNSS module 227, or the NFC module 228 may transmit and receive RF signals via a separate RF module. The SIM 224 may include, for example, a card including the SIM and/or an embedded SIM. The SIM 224 may include a unique identifier (e.g., integrated circuit card identifier (ICCID)) or subscriber information (e.g., international mobile subscriber identity (IMSI)).

The memory 230 (e.g., the memory 130) may include, for example, an internal memory 232 and/or an external memory 234. The internal memory 232 may be at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, a hard drive, or a solid state driver (SSD). The external memory 234 may include a flash drive such as a compact flash (CF) drive, a secure digital (SD), a micro secure digital (Micro-SD), a mini secure digital (Mini-SD), an extreme digital (xD), a multi-media card (MMC), or a memory stick. The external memory 234 may be operatively or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (e.g., a red, green, blue (RGB) sensor) 240H, a biometric sensor 240I, a temperature/humidity sensor 240J, an illuminance sensor 240K, or an ultra violet (UV) sensor 240M. Additionally or alternatively, the sensor module 240 may include, for example, an e-nose sensor, an electromyogram (EMG) sensor, an electroencephaloeram (EEG) sensor, an electrocardiogram (ECG) sensor, an infrared (IR) sensor, an iris sensor, and/or a fingerprint sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252, a (digital) pen sensor 254, a key 256, or an ultrasonic input device 258. The touch panel 252 may operate in at least one of, for example, a capacitive, resistive, infrared, or ultrasonic scheme. The touch panel 252 may further include a control circuit. The touch panel 252 may further include a tactile layer, to thereby provide haptic feedback to the user. The (digital) pen sensor 254 may include, for example, a detection sheet which is a part of the touch panel or configured separately from the touch panel. The key 256 may include, for example, a physical button, an optical key, or a keypad. The ultrasonic input device 258 may sense ultrasonic signals generated by an input tool through a microphone (e.g., a microphone 288), and identify data corresponding to the sensed ultrasonic signals.

The display 260 (e.g., the display 160) may include a panel 262, a hologram device 264, a projector 266, and/or a control circuit for controlling them. The panel 262 may be configured to be, for example, flexible, transparent, or wearable. The panel 262 and the touch panel 252 may be implemented into one module. According to an embodiment, the panel 262 may include a pressure sensor (or force sensor) for measuring the strength of pressure applied by a user's touch. The pressure sensor may be integrated with the touch panel 252 or configured as one or more sensors separately from the touch panel 252. The hologram device 264 may utilize the interference of light waves to provide a three-dimensional image in empty space. The projector 266 may display an image by projecting light on a screen. The screen may be positioned, for example, inside or outside the electronic device 201. The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may, for example, convert a sound to an electrical signal, and vice versa. At least a part of the components of the audio module 280 may be included, for example, in the I/O interface 145 illustrated in FIG. 1. The audio module 280 may process sound information input into, or output from, for example, a speaker 282, a receiver 284, an earphone 286, or the microphone 288. The camera module 291 may capture, for example, still images and a video. According to an embodiment, the camera module 291 may include one or more image sensors (e.g., a front sensor or a rear sensor), a lens, an image signal processor (ISP), or a flash (e.g., an LED or a xenon lamp). The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (e.g., the processor 210), for example, boot status, message status, or charge status. The motor 298 may convert an electrical signal into a mechanical vibration, and generate vibrations or a haptic effect. For example, the electronic device 201 may include a processing device for supporting mobile TV (e.g., a GPU). The processing device for supporting mobile TV may process media data compliant with, for example, digital multimedia broadcasting (DMB), digital video broadcasting (DVB), or mediaFlo™. Each of the above-described components of the electronic device may include one or more parts, and the name of the component may vary with the type of the electronic device. According to various embodiments, some component may be omitted from or added to the electronic device. Or one entity may be configured by combining a part of the components of the electronic device, to thereby perform the same functions of the components prior to the combination.

Figure 3:
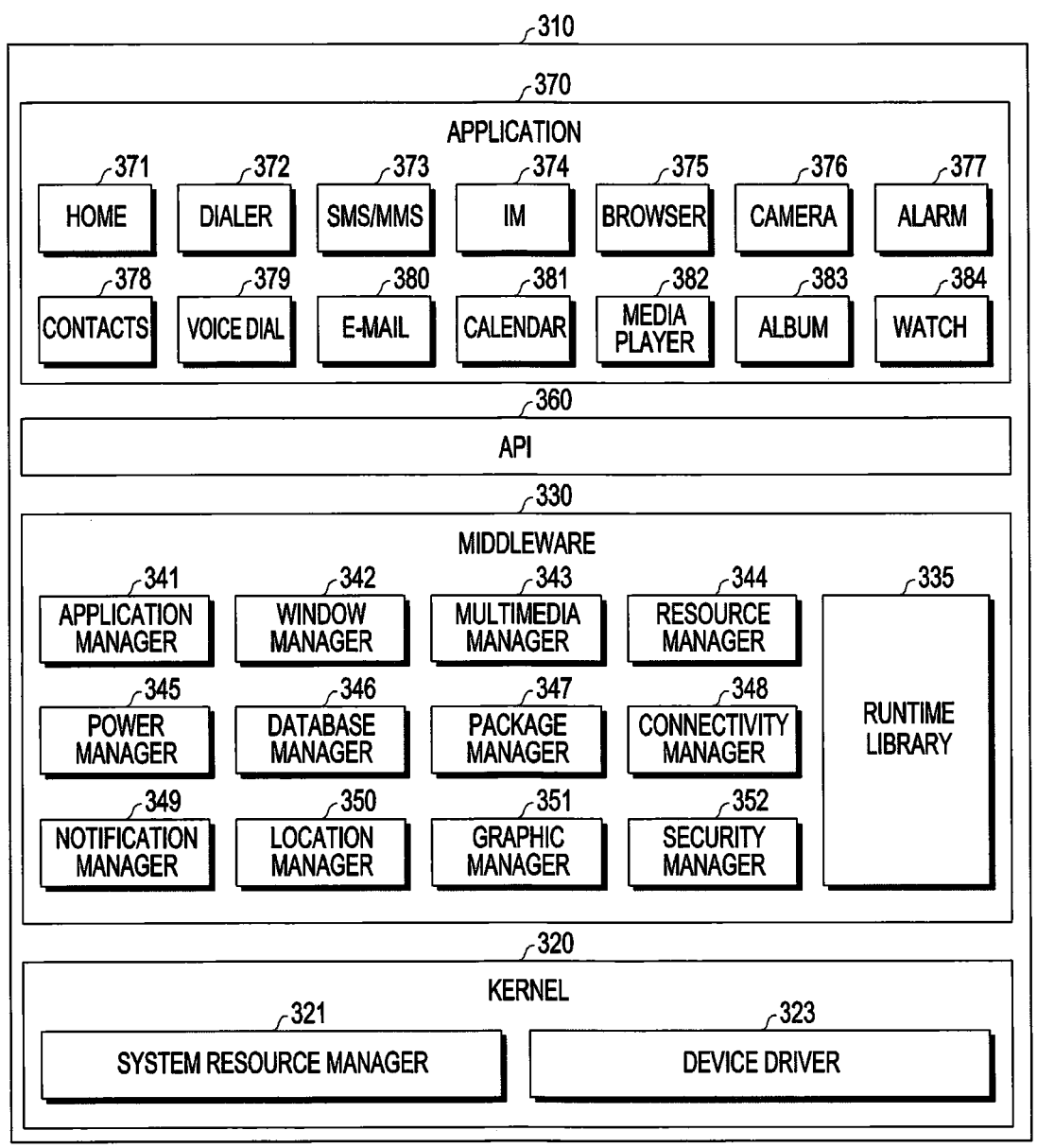
FIG. 3 is a block diagram of a programming module according to various embodiments.

FIG. 3 is a block diagram of a programming module according to various embodiments.

According to an embodiment, a programming module 310 (e.g., the program 140) may include an OS that controls resources related to an electronic device (e.g., the electronic device 101) and/or various applications (e.g., the application programs 217) executed on the OS. For example, the OS may be Android™, iOS™, Windows, Symbian™, Tizen™, or Bada™ Referring to FIG. 3, the programming module 310 may include a kernel 320 (e.g., the kernel 141), middleware 330 (e.g., the middleware 143), an API 360 (e.g., the AP 145), and/or applications 370 (e.g., the application programs 147). At least a part of the programming module 310 may be preloaded on the electronic device or downloaded from an external electronic device (e.g., the electronic device 102 or 104, or the server 106).

The kernel 320 may include, for example, a system resource manager 321 and/or a device driver 323. The system resource manager 321 may control, allocate, or deallocate system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may, for example, provide a function required commonly for the applications 370 or provide various functions to the applications 370 through the API 360 so that the applications 370 may efficiently use limited system resources available within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses to add a new function in a programming language during execution of an application 370. The runtime library 335 may perform input/output management, memory management, a function related to arithmetic function, or the like. The application manager 341 may manage, for example, the life cycle of at least one of the applications 370. The window manager 342 may manage GUI resources used for a screen. The multimedia manager 343 may determine formats required to play back various media files, and may encode or decode a media file using a CODEC suitable for the format of the media file. The resource manager 344 may manage source codes of the applications 370, or a memory space. The power manager 345 may, for example, manage a battery capacity or a power source in conjunction with a basic input/output system (BIOS), and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity. The notification manager 349 may provide an event such as message arrival, a schedule, a proximity alarm, or the like to a user. The location manager 350 may mange, for example, position information about the electronic device. The graphic manager 351 may manage graphical effects to be provided to the user or related user interfaces. The security manager 352 may provide system security or user authentication. According to an embodiment, the middleware 330 may include a telephony manager to manage a voice or video call function of the electronic device, or a middleware module that combines various functions of the above-described components. According to an embodiment, the middleware 330 may provide a customized module for each OS type. The middleware 330 may dynamically delete a part of the existing components or add a new component. The API 360 is, for example, a set of API programming functions, which may be configured differently according to an OS. For example, in the case of Android or iOS, one API set may be provided per platform, whereas in the case of Tizen, two or more API sets may be provided per platform.

The applications 370 may include applications such as home 371, dialer 372, short message service/multimedia messaging service (SMS/MMS) 373, instant message (IM) 374, browser 375, camera 376, alarm 377, contacts 378, voice dial 379, email 380, calendar 381, media player 382, album 383, watch 384, health care (e.g., measurement of an exercise amount or a glucose level), or providing of environment information (e.g., information about atmospheric pressure, humidity, or temperature). According to an embodiment, the applications 370 may include an information exchange application supporting information exchange between the electronic device and an external electronic device. The information exchange application may include, for example, a notification relay application for transmitting specific information to the external electronic device or a device management application for managing the external electronic device. For example, the notification relay application may include a function of transmitting notification information generated from another application to the external electronic device. Also, the notification relay application may receive notification information from the external electronic device and transmit the received notification information to a user. The device management application may install, delete, or update at least one of functions of the external electronic device communicating with the electronic device (e.g., turn-on/turn-off of the external electronic device (or a part of its components) or control of the brightness (or resolution) of the display)) or an application executed in the external electronic device. According to an embodiment, the applications 370 may include an application (e.g., a healthcare application of mobile medical equipment) designated according to a property of the external electronic device. According to an embodiment, the applications 370 may include an application received from an external electronic device. At least a part of the programming module 310 may be configured in software, firmware, hardware, or a combination of at least two of them. At least a part of the programming module 310 may include a module, a program, a routine, a set of instructions, or a process to execute one or more functions.

Figure 4:
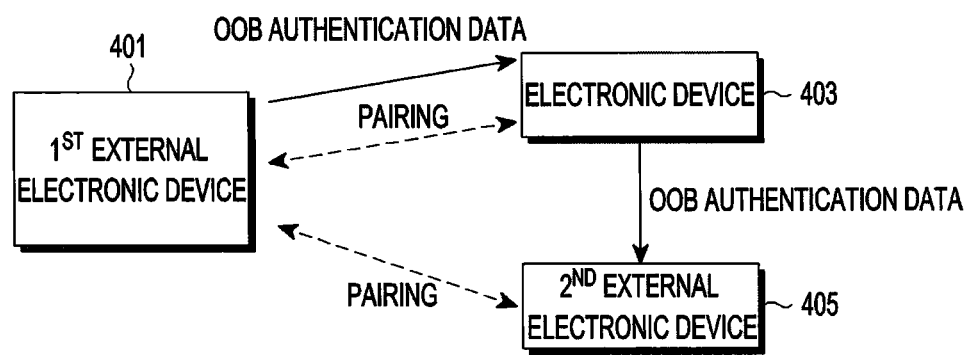
FIG. 4 is a diagram illustrating an electronic device, a first external electronic device, and a second external electronic device according to various embodiments.

FIG. 4 is a diagram illustrating an electronic device, a first external electronic device, and a second external electronic device according to various embodiments.

Referring to FIG. 4, a first external electronic device 401, an electronic device 403, and a second external electronic device 405 may support a Bluetooth protocol. The Bluetooth protocol may include a Bluetooth low energy (BLE) protocol.

According to an embodiment, the electronic device 403 may include all or a part of the components of the electronic device 101 illustrated in FIG. 1 or the electronic device 201 illustrated in FIG. 2.

According to various embodiments, the first external electronic device 401 may be a peripheral device, which is configured to operate in connection to a central device. For example, the first external electronic device 401 may be a speaker, a smart watch, a heart rate monitor, or a BLE proximity sensor tag. Each of the electronic device 403 and the second external electronic device 405 may be a central device having resources such as a sufficient power source and memory relative to a peripheral device. For example, each of the electronic device 403 and the second external electronic device 405 may be a phone, a tablet, or a PC.

According to various embodiments, the first external electronic device 401 may broadcast an advertising packet at every predetermined advertising interval. Each of the electronic device 403 and the second external electronic device 405 may search for the first external electronic device 401 through the advertising packet by scanning, and request a connection to the discovered first external electronic device 401. Each of the electronic device 403 and the second external electronic device 405 may receive a response to the connection request from the first external electronic device 401 and start a pairing procedure. According to an embodiment, the first external electronic device 401 may perform an operation of exchanging a public key with a pairing target (e.g., the electronic device 403 or the second external electronic device 405), an operation of selecting a random value, an operation of obtaining a confirm value by using the selected random value and the public key, and an operation of generating out of band (OOB) authentication data by using the random value and the confirm value in the pairing procedure, and transmit OOB authentication data to the pairing target by OOB communication. According to an embodiment, the OOB authentication data may be defined in the Bluetooth standard. The first external electronic device 401 and the pairing target may perform authentication by using the OOB authentication data, and establish a data channel when the authentication is successful. According to an embodiment, the established data channel may be a secured data channel.

According to various embodiments, the first external electronic device 401 may generate OOB authentication data which is configured to be sharable to the electronic device 403 and the second external electronic device 405 or to an account or group to which the electronic device 403 belongs, and thus be usable one or more times.

According to various embodiments, the electronic device 403 may obtain the OOB authentication data related to the first external electronic device 401 and thus perform pairing with the first external electronic device 401. Further, the electronic device 403 may transmit the obtained OOB authentication data to the second external electronic device 405 so that the second external electronic device 405 may perform pairing with the first external electronic device 401.

According to various embodiments, the electronic device 403 may obtain the OOB authentication data related to the first external electronic device 401 via a connection to the first external electronic device 401 in various communication schemes. The various communication schemes may include a Bluetooth scheme and an OOB scheme. For example, the Bluetooth scheme may include Bluetooth and BLE. For example, the OOB scheme may be any scheme that enables short-range data exchange, such as NFC, camera-based QR code recognition, WiFi Direct, sound-based communication, or light-based communication.

According to an embodiment, when Bluetooth or BLE is used, the electronic device 403 may search for the first external electronic device 401 by scanning, establish a Bluetooth or BLE connection with the discovered first external electronic device 401, check whether the first external electronic device 401 supports an OOB authentication data sharing service, and then obtain the OOB authentication data related to the first external electronic device 401. According to various embodiments, when the electronic device 403 establishes a Bluetooth connection with the first external electronic device 401, the electronic device 403 may determine whether the first external electronic device 401 supports the OOB authentication data sharing service by detecting, for example, a serial port profile (SPP) profile or a profile predetermined for the OOB authentication data sharing service. According to various embodiments, when the electronic device 403 establishes a BLE connection with the first external electronic device 401, the electronic device 403 may determine whether the first external electronic device 401 supports the OOB authentication data sharing service by detecting, for example, an attribute having a transmission and reception property in a generic attribute profile (GATT) or preset OOB authentication data sharing-related service and characteristics in the GATT.

According to various embodiments, the electronic device 403 may transmit the obtained OOB authentication data to the second external electronic device 405 in various data communication schemes. The various data communication schemes may include, for example, communication based on a cellular wireless protocol or a WiFi protocol. As far as it enables data communication, any data communication scheme may be available, in addition to the communication scheme using the cellular wireless protocol or WiFi protocol.

The second external electronic device 405 may perform pairing with the first external electronic device 401 by using the OOB authentication data received from the electronic device 403.

According to an embodiment, from a time when the electronic device 403 obtains the OOB authentication data related to the first external electronic device 401, the first external electronic device 401 may allow establishment of a secured data channel based on the OOB authentication data with the electronic device 403 or allow both secured data channel establishment based on the OOB authentication data and secured data channel establishment based on other OOB authentication data.

The first external electronic device 401 may broadcast an advertising packet including a first identifier (ID) such that at least one electronic device of an account or group to which the OOB authentication data related to the first external electronic device 401 is shareable may discover the first external electronic device 401. The electronic device 403 or the second external electronic device 405 may discover the first external electronic device 401 by the first ID and perform pairing with the first external electronic device 401 by the pre-acquired or received OOB authentication data. According to an embodiment, the first ID may include an ID of the first external electronic device 401. For example, the ID of the first external electronic device 401 may include a Bluetooth medium access control (MAC) address of the first external electronic device 401 or an identity resolving key (IRK) related to a BLE random address. According to an embodiment, the first ID may include a device ID of the first external electronic device 401, and as far as it identifies the first external electronic device 401, such as information included in the GATT of the first external electronic device 401, any information is available. According to an embodiment, the advertising packet may further include a second ID indicating the group or the account.

If each of the electronic device 403 and the second external electronic device 405 is to perform Bluetooth-based pairing with the first external electronic device 401, it may request a connection for authentication to the first external electronic device 401, receive a connection response from the first external electronic device 401, and in the presence of pre-acquired or received OOB authentication data, perform pairing with the first external electronic device 401 by using the already obtained OOB authentication data, without performing all or a part of the public key exchange operation, the random value selection operation, the operation of obtaining a confirm value by using a selected random value and a public key, and the confirm value check operation (or a confirm check operation of a user).

Figure 5:
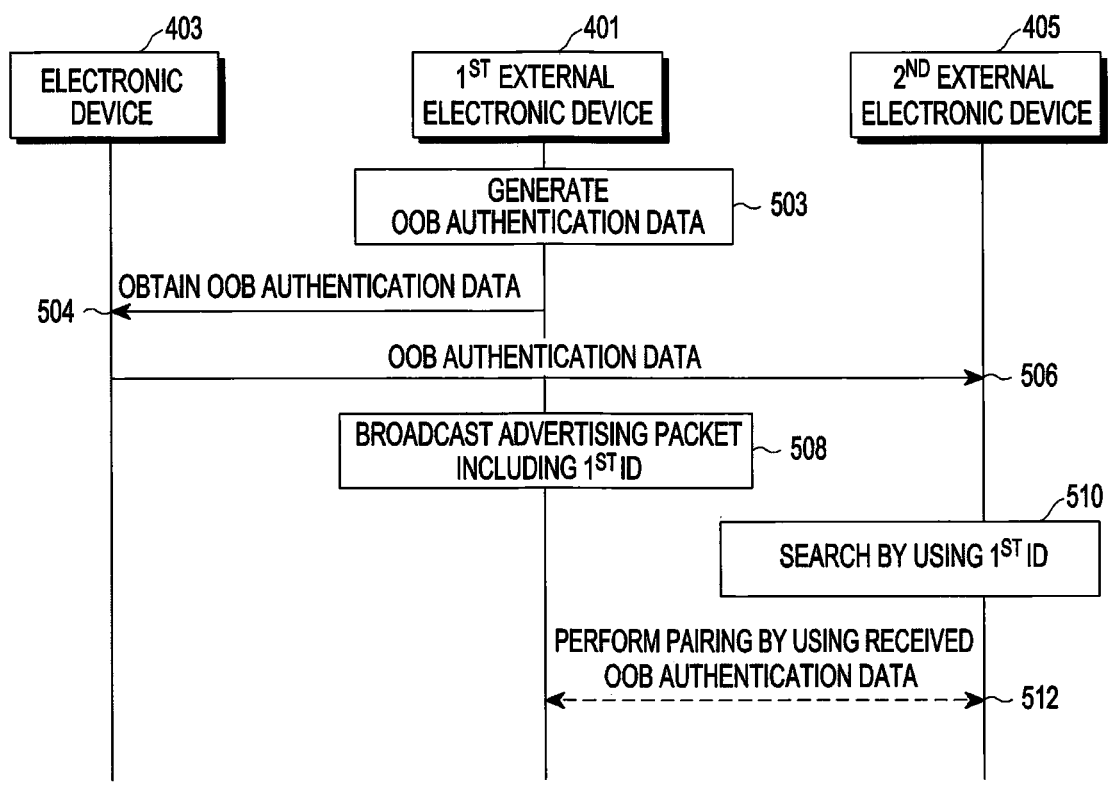
FIG. 5 is a diagram illustrating a signal flow for operations of an electronic device, a first external electronic device, and a second external electronic device according to various embodiments.

FIG. 5 is a diagram illustrating a signal flow for operations of an electronic device, a first external electronic device, and a second external electronic device according to various embodiments.

Referring to FIG. 5, the first external electronic device 401 may generate OOB authentication data related to the first external electronic device 401 in operation 502. According to various embodiments, the first external electronic device 401 may generate OOB authentication data which is configured to be sharable to the electronic device 403 and the second external electronic device 405 or to an account or group to which the electronic device 403 belongs, and thus usable one or more times. According to an embodiment, the OOB authentication data may be defined in the Bluetooth standard. According to an embodiment, the OOB authentication data may include the ID of the first external electronic device 401, a random value selected by the first external electronic device 401, and a confirm value obtained by applying a predetermined function to the selected random value and a public key. According to various embodiments, the OOB authentication data related to the first external electronic device 401 may be generated, when an electronic device of the account or group is initially connected to the first external electronic device 401. For example, when the electronic device 403 requests support of OOB authentication to the first external electronic device 401, the OOB authentication data related to the first external electronic device 401 may be generated.

The electronic device 403 may obtain the OOB authentication data related to the first external electronic device 401 in operation 504. According to various embodiments, the electronic device 403 may obtain the OOB authentication data related to the first external electronic device 401 via a connection to the first external electronic device 401 in various communication schemes.

The various communication schemes may include a Bluetooth scheme and an OOB scheme. For example, the Bluetooth scheme may include classic Bluetooth (before BLE) and BLE. The OOB scheme may be any scheme that enables short-range data exchange, such as NFC, camera-based QR code recognition, WiFi Direct, sound-based communication, or light-based communication.

According to an embodiment, when Bluetooth or BLE is used, the electronic device 403 may search for the first external electronic device 401 by scanning, establish a Bluetooth or BLE connection with the discovered first external electronic device 401, check whether the first external electronic device 401 supports an OOB authentication data sharing service, and then obtain the OOB authentication data related to the first external electronic device 401. According to various embodiments, when the electronic device 403 establishes a Bluetooth connection with the first external electronic device 401, the electronic device 403 may determine whether the first external electronic device 401 supports the OOB authentication data sharing service, for example, by using an SPP profile or detecting a profile predetermined for the OOB authentication data sharing service. According to various embodiments, when the electronic device 403 establishes a BLE connection with the first external electronic device 401, the electronic device 403 may determine whether the first external electronic device 401 supports the OOB authentication data sharing service by an attribute having a transmission and reception property in a GATT or preset OOB authentication data sharing-related service and characteristics in the GATT.

According to various embodiments, when an OOB-based connection scheme is used, the electronic device 403 may obtain the OOB authentication data related to the first external electronic device 401 through NFC tagging, camera-based QR code recognition, WiFi Direct communication, recognition of sound received through a microphone, or analysis of light received through a light receiving device.

In operation 506, the electronic device 403 may transmit the obtained OOB authentication data related to the first external electronic device 401 to the second external electronic device 405. According to an embodiment, the OOB authentication data may include a first ID corresponding to the ID of the first external electronic device 401. For example, the ID of the first external electronic device 401 may include the Bluetooth MAC address of the first external electronic device 401 or the IRK related to the BLE random address. According to various embodiments, the first ID may include the device ID of the first external electronic device 401. As far as it identifies the first external electronic device 401 such as information included in the GATT of the first external electronic device 401, any information may be used. According to an embodiment, the OOB authentication data may further include the second ID identifying the group or the account.

The first external electronic device 401 may broadcast an advertising packet including the first ID in operation 508. According to an embodiment, the first external electronic device 401 may broadcast the advertising packet including the first ID such that at least one electronic device of an account or group to which the OOB authentication data related to the first external electronic device 401 is shareable may discover the first external electronic device 401. According to an embodiment, the advertising packet may further include the second ID identifying the group or the account.

The second external electronic device 405 may search for the first external electronic device 401 by the first ID included in the received OOB authentication data in operation 510. According to an embodiment, the second external electronic device 405 may receive the advertising packet including the first ID, broadcast from the first external electronic device 401, and search for the first external electronic device 401 by comparing the first ID included in the advertising packet with a pre-received first ID.

In operation 512, the second external electronic device 405 may perform pairing with the first external electronic device 401 by using the received OOB authentication data. According to an embodiment, the second external electronic device 405 may request pairing for authentication to the discovered first external electronic device 401, receive a pairing response from the first external electronic device 401, and perform pairing with the first external electronic device 401 by using the received OOB authentication data, without performing all or a part of the public key exchange operation, the random value selection operation, the operation of obtaining a confirm value by using a selected random value and a public key, and the confirm value check operation (or a confirm check operation of a user) because there is the received OOB authentication data.

According to various embodiments, the electronic device 403 may transmit the OOB authentication data related to the first external electronic device 401 to a server (e.g., the server 106 in FIG. 1), and the server may transmit the received OOB authentication data to the second external electronic device 405. For example, the second external electronic device 405 may be one of at least one electronic device having the same account as the electronic device 403 or belonging to the same group as the electronic device 403.

Figure 6:
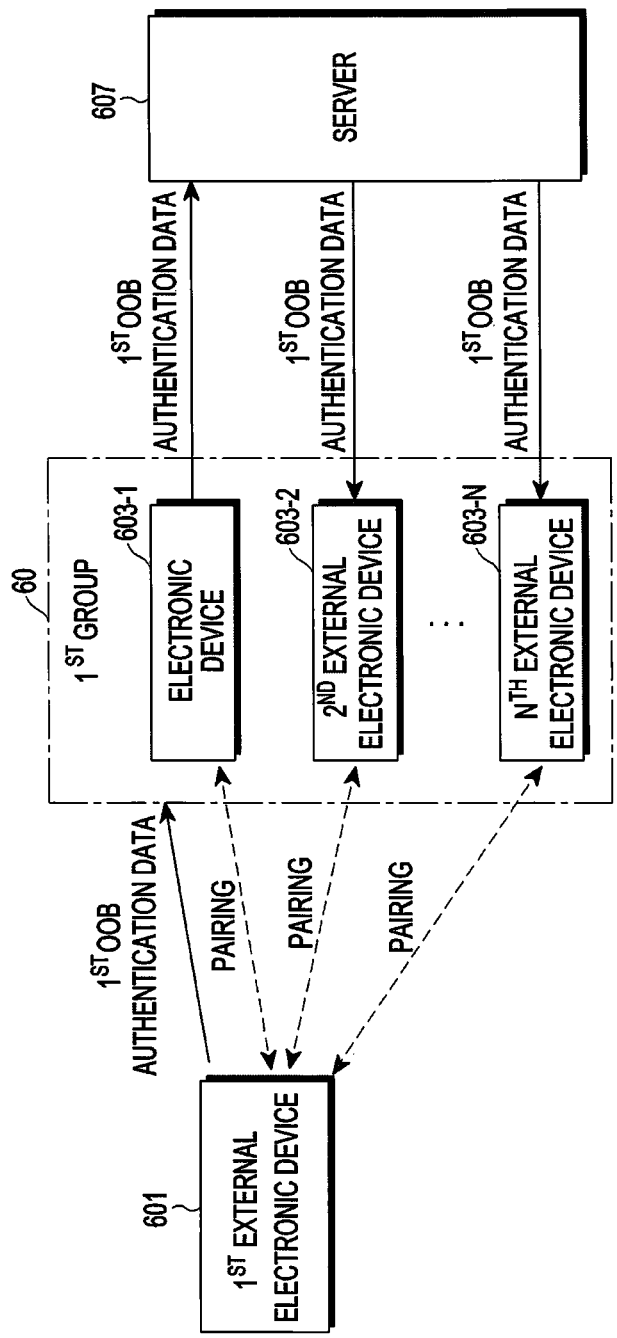
FIG. 6 is a diagram illustrating an electronic device, first to $N^{th}$ external electronic devices, and a server according to various embodiments.

FIG. 6 is a diagram illustrating an electronic device, first to $N^{th}$ external electronic devices, and a server according to various embodiments.

Referring to FIG. 6, a first external electronic device 601, an electronic device 603-1, and second to $N^{th}$ external electronic devices 603-2 to 603-N may support the Bluetooth protocol. The Bluetooth protocol may include the BLE protocol. According to an embodiment, the electronic device 603-1 may include all or a part of the components of the electronic device 101 illustrated in FIG. 1 or the electronic device 201 illustrated in FIG. 2.

According to various embodiments, the first external electronic device 601 may be a peripheral device, which is configured to operate in connection to a central device. For example, the first external electronic device 601 may be a speaker, a smart watch, a heart rate monitor, or a BLE proximity sensor tag. Each of the electronic device 603-1 and the second to N$^{th}$ external electronic devices 603-2 to 603-N may be a central device which has resources such as a sufficient power source and memory relative to a peripheral device. For example, each of the electronic device 603-1 and the second to N$^{th}$ external electronic devices 603-2 to 603-N may be a phone, a tablet, or a PC. According to various embodiments, the electronic device 603-1 and the second to N$^{th}$ external electronic devices 603-2 to 603-N may belong to a predetermined group or account. According to an embodiment, the electronic device 603-1 and the second to N$^{th}$ external electronic devices 603-2 to 603-N may belong to a first group 60. According to various embodiments, while the first group 60 is shown as including the plurality of second to N$^{th}$ external electronic devices 603-2 to 603-N, the first group 60 may include only the electronic device 603-1 and the second external electronic device 603-2.

According to various embodiments, the first external electronic device 601 may broadcast an advertising packet at every predetermined advertising interval. Each of the electronic device 603-1 and the second to N$^{th}$ external electronic devices 603-2 to 603-N may search for the first external electronic device 601 through the advertising packet by scanning, and request a connection to the discovered first external electronic device 601. Each of the electronic device 603-1 and the second to N$^{th}$ external electronic devices 603-2 to 603-N may receive a response to the connection request from the first external electronic device 601 and perform a pairing procedure.

According to an embodiment, the first external electronic device 601 may generate OOB authentication data required to perform pairing with a pairing target (e.g., the electronic device 603-1 or one of the second to N$^{th}$ external electronic devices 603-2 to 603-N). According to an embodiment, the OOB authentication data may be defined in the Bluetooth standard.

According to various embodiments, the first external electronic device 601 may generate the OOB authentication data before or during pairing with one of pairing targets (e.g., the electronic device 603-1 or one of the second to N$^{th}$ external electronic devices 603-2 to 603-N).

According to an embodiment, when the first external electronic device 601 generates the OOB authentication data during pairing with one of pairing targets, the first external electronic device 601 may generate the OOB authentication data by performing at least a part of an operation of exchanging a public key and a private key, an operation of selecting a random value, an operation of obtaining a confirm value by using the selected random value and the public key.

According to an embodiment, the OOB authentication data related to the first external electronic device 601 may be generated during initial pairing with one electronic device of the first group 60.

According to various embodiments, the first external electronic device 601 may generate first OOB authentication data related to the first external electronic device 601, which is configured to be sharable to the account or group to which the electronic device 603-1 and the second to N$^{th}$ external electronic devices 603-2 to 603-N belong, and thus usable one or more times.

According to various embodiments, the electronic device 603-1 may obtain the first OOB authentication data related to the first external electronic device 601 via a connection to the first external electronic device 601 in various communication schemes. The various communication schemes may include a Bluetooth scheme and an OOB scheme. The Bluetooth scheme may include classic Bluetooth (before BLE) and BLE. The OOB scheme may be any scheme that enables short-range data exchange, such as NFC, camera-based QR code recognition, WiFi Direct, sound-based communication, or light-based communication. According to an embodiment, when Bluetooth or BLE is used, the electronic device 603-1 may search for the first external electronic device 601 by scanning, establish a Bluetooth or BLE connection with the discovered first external electronic device 601, check whether the first external electronic device 601 supports an OOB authentication data sharing service, and then obtain the first OOB authentication data related to the first external electronic device 601. According to various embodiments, if the electronic device 603-1 establishes a Bluetooth connection, the electronic device 603-1 may determine whether the first external electronic device 601 supports the OOB authentication data sharing service by detecting, for example, an SPP profile or a profile predetermined for the OOB authentication data sharing service. According to various embodiments, if the electronic device 603-1 establishes a BLE connection, the electronic device 603-1 may determine whether the first external electronic device 601 supports the OOB authentication data sharing service by detecting, for example, an attribute having a transmission and reception property in a GATT or preset OOB authentication data sharing-related service and characteristics in the GATT.

According to various embodiments, the electronic device 603-1 may transmit the obtained first OOB authentication data to a server 607 (e.g., the server 106 in FIG. 1) in various data communication schemes. The data communication scheme may be, for example, communication based on a cellular wireless protocol or a WiFi protocol. As far as it enables data communication, any data communication scheme may be available, in addition to the communication scheme using the cellular wireless protocol or WiFi protocol.

The server 607 may receive the first OOB authentication data which is allowed to be shared, from at least one electronic device (e.g., the electronic device 603-1) of the first group 60 (or a first account) to which the electronic device 603-1 belongs, and store (or register) the received first OOB authentication data. The server 607 may transmit the first OOB authentication data to other electronic devices (e.g., the second to N$^{th}$ external electronic devices 603-2 to 603-N) of the first group 60. Each of the other electronic devices (e.g., the second to N$^{th}$ external electronic devices 603-2 to 603-N) of the first group 60 may perform pairing with the first external electronic device 601 by using the first OOB authentication data received from the server 607.

According to an embodiment, the first external electronic device 601 may allow establishment of a secured data channel based on the first OOB authentication data, from a time when the first OOB authentication data is obtained by the electronic device 603-1 or stored (or registered) in the server 607. According to an embodiment, the first external electronic device 601 may also allow establishment of a secured data channel based on second OOB authentication data different from the first OOB authentication data. For example, the first external electronic device 601 may generate and store a plurality of different OOB authentication data. The plurality of different OOB authentication data may correspond to a plurality of different accounts or groups, respectively.

The first external electronic device 601 may broadcast an advertising packet including a first ID such that each of the electronic device 603-1 and the second to N$^{th}$ external electronic devices 603-2 to 603-N of the first group 60 allowed to share the first OOB authentication data may search for the first external electronic device 601. At least one of the electronic device 603-1 and the second to $N^{th}$ external electronic devices 603-2 to 603-N may search for the first external electronic device 601 by the first ID included in the first OOB authentication data and perform pairing with the first external electronic device 601 by information included in the first OOB authentication data, for example, a random value and a confirm value. According to an embodiment, the first ID may include a Bluetooth MAC address of the first external electronic device 601 or an IRK related to a BLE random address. According to an embodiment, the first ID may include a device ID of the first external electronic device 601, and as far as it identifies the first external electronic device 601, such as information included in the GATT of the first external electronic device 601, any information is available. According to an embodiment, the first OOB authentication data may further include a second ID indicating the group or account.

When performing BLE-based pairing with the first external electronic device 601, each of the electronic device 603-1 and the second to $N^{th}$ external electronic devices 603-2 to 603-N may request pairing for authentication to the first external electronic device 601, receive a pairing response from the first external electronic device 601, and perform pairing with the first external electronic device 601 by using the OOB authentication data received from the server 607, without performing all or a part of a public key exchange operation, a random value selection operation, an operation of obtaining a confirm value by using a selected random value and a public key, and a confirm value check operation (or a confirm check operation of a user).

According to various embodiments, the server 607 may receive a plurality of different OOB authentication data related to the first external electronic device 601 in correspondence with a plurality of respective groups or accounts, and store (or register) the OOB authentication data on a group basis or on an account basis. For example, the server 607 may receive second OOB authentication data which is allowed to be shared with at least one electronic device of a second group (not shown) (or a second account) other than the first group 60, store (or register) the second OOB authentication data, and transmit the second OOB authentication data to at least one electronic device of the second group. Each of the at least one electronic device of the second group may perform pairing with the first external electronic device 601 by using the second OOB authentication data received from the server 607. According to various embodiments, a part of the electronic devices in the first group may also belong to the second group.

Figure 7:
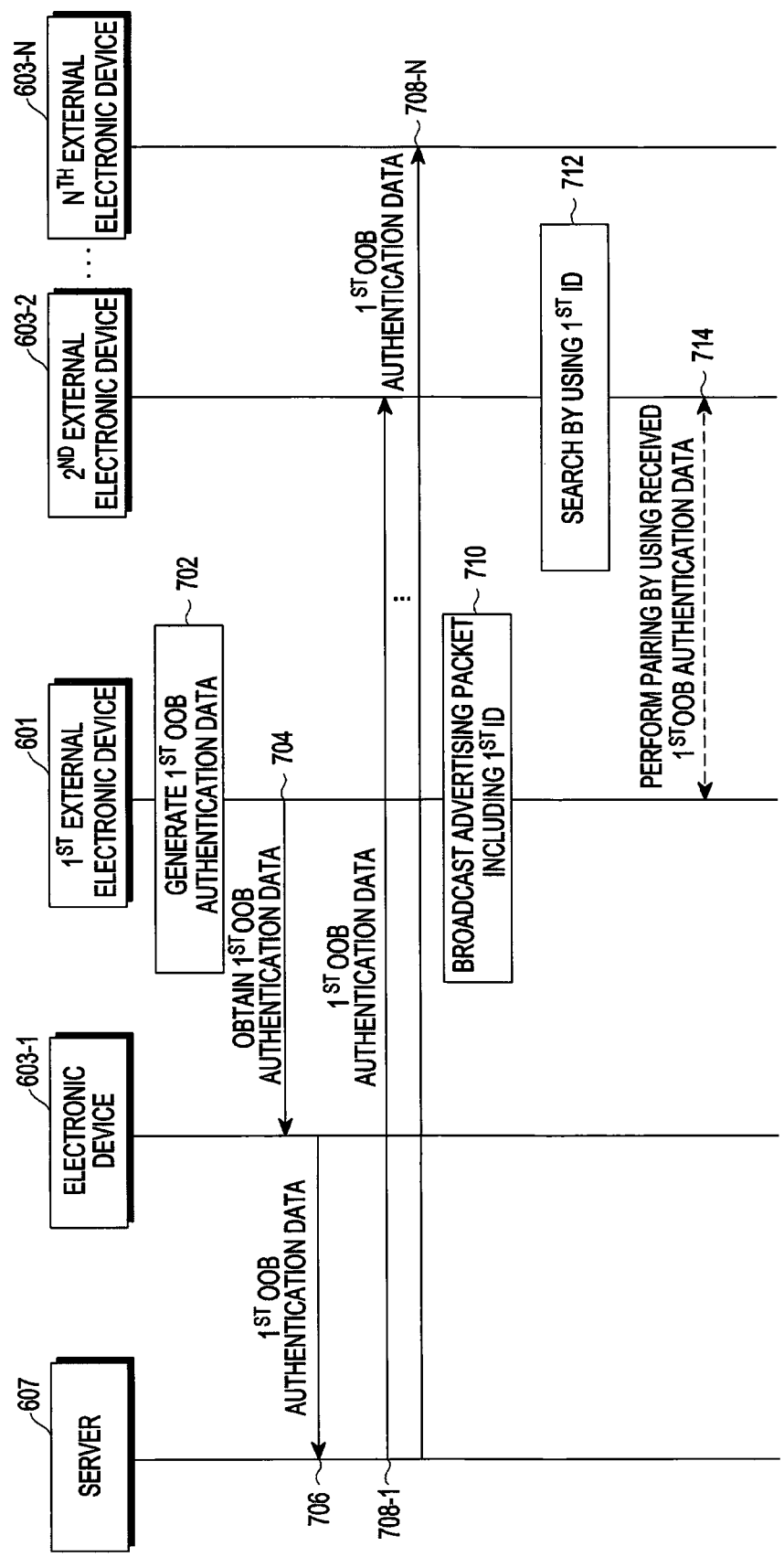
FIG. 7 is a diagram illustrating a signal flow for operations of an electronic device, first to $N^{th}$ external electronic devices, and a server according to various embodiments.

FIG. 7 is a diagram illustrating a signal flow for operations of an electronic device, first to $N^{th}$ external electronic devices, and a server according to various embodiments.

Referring to FIG. 7, the first external electronic device 601 may generate first OOB authentication data related to the first external electronic device 601 in operation 702. According to various embodiments, the first external electronic device 601 may generate the first OOB authentication data which is configured to be sharable to a first group (or account) (e.g., the first group 60 in FIG. 6) to which the electronic device 603-1 and the second to $N^{th}$ external electronic devices 603-2 to 603-N belong, and thus be usable one or more times. According to an embodiment, the first OOB authentication data may include a first ID being the ID of the first external electronic device 601, a random value selected by the first external electronic device 601, and a confirm value obtained by applying a predetermined function to the selected random value and a public key. According to various embodiments, the first OOB authentication data related to the first external electronic device 601 may be generated before or during pairing between the first external electronic device 601 and with one of the electronic devices of the first group (or account). According to an embodiment, the OOB authentication data related to the first external electronic device 601 may be generated during initial pairing between the first external electronic device 601 and one electronic device of the first group (or account). According to an embodiment, the first OOB authentication data may further include the second ID indicating the group or account.

In operation 704, the electronic device 603-1 may obtain the first OOB authentication data related to the first external electronic device 601. According to various embodiments, the electronic device 603-1 may obtain the first OOB authentication data related to the first external electronic device 601 via a connection to the first external electronic device 601 in various communication schemes. The various communication schemes may include a Bluetooth scheme and an OOB scheme. The Bluetooth scheme may include classic Bluetooth (before BLE) and BLE. The OOB scheme may be any scheme that enables short-range data exchange, such as NFC, camera-based QR code recognition, WiFi Direct, sound-based communication, or light-based communication.

According to an embodiment, when Bluetooth or BLE is used, the electronic device 603-1 may search for the first external electronic device 601 by scanning, establish a Bluetooth or BLE connection with the discovered first external electronic device 601, check whether the first external electronic device 601 supports an OOB authentication data sharing service, and then obtain the first OOB authentication data related to the first external electronic device 601. For example, when the electronic device 603-1 establishes a Bluetooth connection with the first external electronic device 601, the electronic device 603-1 may determine whether the first external electronic device 601 supports the OOB authentication data sharing service by detecting an SPP profile or a profile predetermined for the OOB authentication data sharing service in the GATT. In another example, when the electronic device 603-1 establishes a BLE connection with the first external electronic device 601, the electronic device 603-1 may determine whether the first external electronic device 601 supports the OOB authentication data sharing service through, for example, an attribute having a transmission and reception property in a GATT or by detecting preset OOB authentication data sharing-related service and characteristics in the GATT.

According to various embodiments, when an OOB-based connection scheme is used, the electronic device 603-1 may obtain the first OOB authentication data through NFC tagging, camera-based QR code recognition, WiFi Direct communication, recognition of sound received through a microphone, or analysis of light received through a light receiving device.

In operation 706, the electronic device 603-1 may transmit the obtained first OOB authentication data to the server 607. According to an embodiment, the electronic device 603-1 may perform pairing with the first external electronic device 601 by using the obtained first OOB authentication data and then transmit the first OOB authentication data to the server 607.

According to an embodiment, the first OOB authentication data may include a first ID being the ID of the first external electronic device. For example, the first ID may include the Bluetooth MAC address of the first external electronic device or the IRK related to the BLE random address. According to various embodiments, the first ID may include the device ID of the first external electronic device. As far as it identifies the first external electronic device, such as information included in the GATT of the first external electronic device 601, any information may be used. According to an embodiment, the first OOB authentication data may further include the second ID identifying the group or the account. According to an embodiment, the first ID and the second ID may be transmitted separately without being included in the first OOB authentication data.

According to an embodiment, the server 607 may identify the first group (or the first account) to which the electronic device 603-1 belongs by at least one of the first ID or the second ID, and store (or register) the received first OOB authentication data in relation to the first group 60.

In operations 708-1 to 708-N, the server 607 may transmit the first OOB authentication data to each of the second to $N^{th}$ external electronic devices 603-2 to 603-N of the first group. According to an embodiment, the first ID may be transmitted in the first OOB authentication data or separately from the first OOB authentication data. According to various embodiments, the server 607 may provide the first OOB authentication data to each of the second to $N^{th}$ external electronic devices 603-2 to 603-N of the first group, upon request or by a push message. Each of the second to $N^{th}$ external electronic devices 603-2 to 603-N of the first group may attempt to perform pairing with the first external electronic device 601 by using the first OOB authentication data received from the server 607.

In operation 710, the first external electronic device 601 may broadcast an advertising packet including the first ID. According to an embodiment, the first external electronic device 601 may broadcast the advertising packet including the first ID such that the electronic device 603-1 and the second to $N^{th}$ external electronic devices 603-2 to 603-N of the first group may search for the first external electronic device 601.

Each of the electronic device 603-1 and the second to $N^{th}$ external electronic devices 603-2 to 603-N may search for the first external electronic device 601 by the first ID. (Hereinbelow, "the second external electronic device 603-2" will be taken as an example). In operation 712, the second external electronic device 603-2 may search for the first external electronic device 601 by using the first ID. According to an embodiment, the second external electronic device 603-2 may search for the first external electronic device 601 by comparing the first ID included in the advertising packet with a pre-received first ID.

In operation 714, the second external electronic device 603-2 may perform pairing with the first external electronic device 601 by the first OOB authentication data received from the server 607. According to an embodiment, the second external electronic device 603-2 may request pairing for authentication (e.g., account authentication or group authentication) to the discovered first external electronic device 601, receive a pairing response from the first external electronic device 601, and perform pairing with the first external electronic device 601 by using the received first OOB authentication data, without performing all or a part of the public key exchange operation, the random value selection operation, the operation of obtaining a confirm value by using a selected random value and a public key, and the confirm value check operation (or a confirm check operation of a user) because there are the received OOB authentication data. Each of the other electronic devices of the first group may perform pairing with the first external electronic device 601 by using the received first OOB authentication data, like the second external electronic device 603-2.

According to various embodiments, a valid duration or a valid connection number may be set for OOB authentication data related to the first external electronic device (e.g., 401 or 601), which is configured to be sharable to the electronic device and the second to $N^{th}$ external electronic devices, 603-1 to 603-N of the first group 60).

Figure 8:
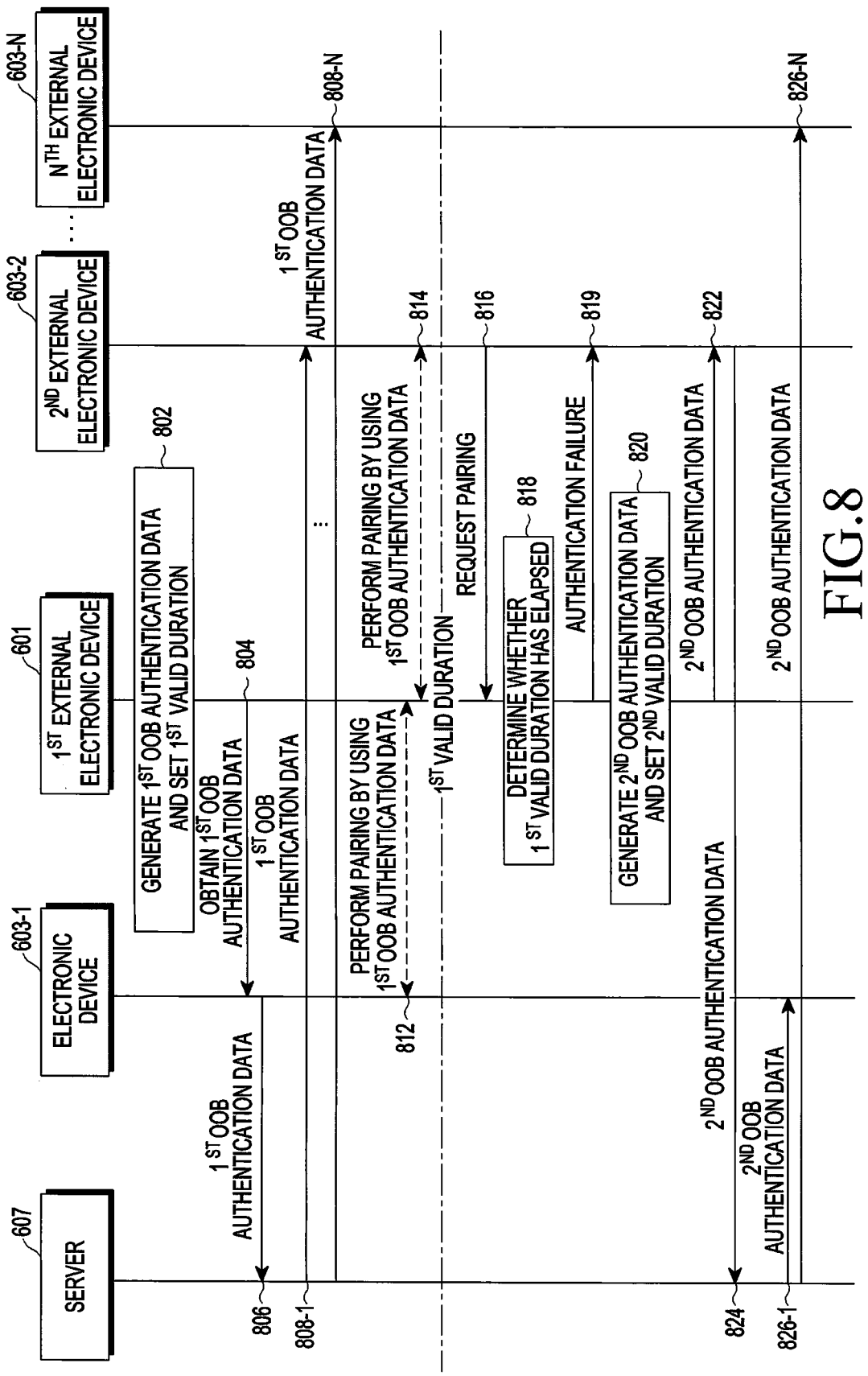
FIG. 8 is a diagram illustrating a signal flow for operations of an electronic device, first to $N^{th}$ external electronic devices, and a server, based on a valid duration set for out of band (OOB) authentication data according to various embodiments.

FIG. 8 is a diagram illustrating a signal flow for operations of an electronic device, first to $N^{th}$ external electronic devices, and a server, based on a valid duration set for OOB authentication data according to various embodiments.

Referring to FIG. 8, the first external electronic device 601 may generate first OOB authentication data related to the first external electronic device 601 and set a first valid duration for the generated first OOB authentication data in operation 802. According to various embodiments, the first external electronic device 601 may store a time or date on which the first OOB authentication data has been generated and a valid duration during which the first OOB authentication data is available from the time or date. According to various embodiments, the first OOB authentication data may be configured to be sharable to the electronic device 603-1 and the second to $N^{th}$ external electronic devices 603-2 to 603-N which belong to a first group (or account) (e.g., the first group 60 in FIG. 6) and usable one or more times or a predetermined number of times during the first valid duration in the electronic device 603-1 and the second to $N^{th}$ external electronic devices 603-2 to 603-N which belong to the first group (or account). According to an embodiment, the first OOB authentication data may include a first ID being the ID of the first external electronic device 601, a random value selected by the first external electronic device 601, and a confirm value obtained by applying a predetermined function to the selected random value and a public key. According to various embodiments, the first OOB authentication data related to the first external electronic device 601 may be generated, when an electronic device of the first group (or account) is initially connected to the first external electronic device 601. According to various embodiments, the valid duration of the first OOB authentication data may be set, when or after the first OOB authentication data is generated. According to an embodiment, the valid duration of the first OOB authentication data may be set at a time when the first OOB authentication data is generated and then transmitted to any of the electronic device 603-1 and the second to $N^{th}$ external electronic devices 603-2 to 603-N which belong to the first group (or account).

In operation 804, the electronic device 603-1 may obtain the first OOB authentication data related to the first external electronic device 601. According to various embodiments, the electronic device 603-1 may obtain the first OOB authentication data related to the first external electronic device 601 via a connection to the first external electronic device 601 in various communication schemes. The various communication schemes may include a Bluetooth scheme and an OOB scheme. The Bluetooth scheme may include classic Bluetooth (before BLE) and BLE. The OOB scheme may be any scheme that enables short-range data exchange, such as NFC, camera-based QR code recognition, WiFi Direct, sound-based communication, or light-based communication.

In operation 806, the electronic device 603-1 may transmit the first OOB authentication data related to the first external electronic device 601 to the server 607. According to an embodiment, the first OOB authentication data may include the first ID being the ID of the first external electronic device 601. According to an embodiment, the ID of the first external electronic device 601 may include the Bluetooth MAC address of the first external electronic device 601 or the IRK related to the BLE random address. According to various embodiments, the first ID may include the device ID of the first external electronic device 601. As far as it identifies the first external electronic device 601, such as information included in the GATT of the first external electronic device 601, any information may be used. According to an embodiment, the first OOB authentication data may further include the second ID identifying the group or the account. According to an embodiment, the first ID and the second ID may be transmitted separately without being included in the first OOB authentication data.

The server 607 may identify the first group (e.g., the first group 60 in FIG. 6) (or the first account) to which the electronic device 603-1 belongs by the first ID and store (or register) the received first OOB authentication data in relation to the first group.

In operations 808-1 to 808-N, the server 607 may provide the first OOB authentication data to each of the second to $N^{th}$ external electronic devices 603-2 to 603-N of the first group. According to an embodiment, the first ID may be transmitted in the first OOB authentication data or separately from the first OOB authentication data. According to various embodiments, the server 607 may provide the first OOB authentication data to each of the second to $N^{th}$ external electronic devices 603-2 to 603-N of the first group, upon request or by a push message.

The first external electronic device 601 may broadcast an advertising packet including the first ID. According to an embodiment, the first external electronic device 601 may broadcast the advertising packet including the first ID such that the electronic device 603-1 and the second to $N^{th}$ external electronic devices 603-2 to 603-N of the first group 60 may search for the first external electronic device 601. According to an embodiment, the first ID of the first external electronic device 601 may include the Bluetooth MAC address of the first external electronic device 601 or the IRK related to the BLE random address. According to various embodiments, the first ID may include the device ID of the first external electronic device 601. As far as it identifies the first external electronic device 601 such as information included in the GATT of the first external electronic device 601, any information may be used. According to an embodiment, the advertising packet may further include the second ID identifying the group or the account.

Each of the electronic device 603-1 and the second to $N^{th}$ external electronic devices 603-2 to 603-N of the first group may search for the first external electronic device 601 by the first ID and perform pairing with the first external electronic device 601 by using the first OOB authentication data received from the server 607. (Hereinbelow, the following description is given in the context of "the electronic device 603-1" and "the second external electronic device 603-2", by way of example).

In operations 812 and 814, each of the electronic device 601 and the second external electronic device 603-2 may search for the first external electronic device 601 by the first ID and perform pairing with the first external electronic device 601 by the first OOB authentication data received from the server 607. According to an embodiment, each of the electronic device 601 and the second external electronic device 603-2 may request pairing for authentication to the discovered first external electronic device 601, receive a pairing response from the first external electronic device 601, and perform pairing with the first external electronic device 601 by using the received first OOB authentication data, without performing all or a part of the public key exchange operation, the random value selection operation, the operation of obtaining a confirm value by using a selected random value and a public key, and the confirm value check operation (or a confirm check operation of a user) because there are the received OOB authentication data. Each of the other electronic devices of the first group may also perform pairing with the first external electronic device 601 by using the received first OOB authentication data.

After the first valid duration elapses, the first external electronic device 601 may receive a pairing request from one (e.g., the second external electronic device 603-2) of the electronic device 603-1 and the second to $N^{th}$ external electronic devices 603-2 to 603-N in operation 816.

The first external electronic device 601 may determine that the first valid duration has elapsed in operation 818. According to various embodiments, the first external electronic device 601 may determine whether the difference between the time or date of generating the first OB authentication data and a pairing action time exceeds the first valid duration by comparing the time or date of generating the first OB authentication data with the pairing action time. Further, after succeeding in pairing with the second external electronic device 603-2 according to a pairing request, the first external electronic device 601 may determine whether the difference between the pre-stored time or date of generating the first OB authentication data and the pairing action time exceeds the first valid duration by comparing the time or date of generating the first OB authentication data with the pairing action time.

When the first valid duration has elapsed, the first external electronic device 601 may perform an authentication failure process in operation 819. According to an embodiment, the first external electronic device 601 may transmit a fail signal to the second external electronic device 603-2 according to the result of the determination as to whether the first valid duration has elapsed during pairing according to the pairing request from the second external electronic device 603-2.

When the authentication has been processed as failure due to the timeout of the first valid duration, the first external electronic device 601 may generate second OOB authentication data and set a second valid duration for the generated second OOB authentication data in operation 820. According to various embodiments, the first external electronic device 601 may store a time or date on which the second OOB authentication data has been generated and the second valid duration during which the second OOB authentication data is available from the time or date.

In operation 822, the first external electronic device 601 may transmit the second OOB authentication data to the second external electronic device 603-2. According to various embodiments, the first external electronic device 601 may transmit the second OOB authentication data for which the second valid duration has been set to the second external electronic device 603-2 which is the first electronic device paired after the first valid duration elapsed. According to various embodiments, the second external electronic device 603-2 may receive the second OOB authentication data from the first external electronic device 601 in various communication schemes. The various communication schemes may include a Bluetooth scheme and an OOB scheme. The Bluetooth scheme may include classic Bluetooth (before BLE) and BLE. The OOB scheme may be any scheme that enables short-range data exchange, such as NFC, camera-based QR code recognition, WiFi Direct, sound-based communication, or light-based communication.

In operation 824, the second external electronic device 603-2 may transmit the second OOB authentication data to the server 607. According to an embodiment, the second OOB authentication data may include the first ID being the ID of the first external electronic device 601. According to an embodiment, the ID of the first external electronic device 601 may include the Bluetooth MAC address of the first external electronic device 601 or the IRK related to the BLE random address. According to various embodiments, the first ID may include the device ID of the first external electronic device 601. As far as it identifies the first external electronic device 601 such as information included in the GATT of the first external electronic device 601, any information may be used. According to an embodiment, the second OOB authentication data may further include the second ID identifying the group or the account.

The server 607 may identify the first group (or the first account) to which the electronic device 603-1 belongs by the first ID, update the first OOB authentication data prestored (or pre-registered) in relation to the first group to the received second OOB authentication data, and store (or register) the updated second OOB authentication data.

In operations 826-1 to 826-N, the server 607 may provide the second OOB authentication data to each of the electronic device 603-1 and the second to $N^{th}$ external electronic devices 603-2 to 603-N of the first group. According to an embodiment, the first ID and the second ID may be transmitted in the second OOB authentication data or separately from the second OOB authentication data. According to various embodiments, the server 607 may provide the second OOB authentication data to each of the electronic device 603-1 and the second to $N^{th}$ external electronic devices 603-2 to 603-N of the first group, upon request or by a push message.

According to various embodiments, when the first valid duration has elapsed, the first external electronic device 601 may transmit the second OOB data to at least one of electronic devices (e.g., the electronic device 603-1 and the second to $N^{th}$ external electronic devices 603-2 to 603-N) connected to the first external electronic device 601, or in the absence of any connected electronic device, to the server 607. According to an embodiment, the first external electronic device 601 may transmit the second OOB data to the server 607 by an internet protocol (IP) communication protocol. According to various embodiments, after the timeout of the first valid duration, the first external electronic device 601 may transmit the second OOB authentication data to at least one of electronic devices (e.g., the electronic device 603-1 and the second to $N^{th}$ external electronic devices 603-2 to 603-N) initially connected to the first external electronic device 601. An electronic device which has received the second OOB data from the first external electronic device 601 may transmit the received second OOB data to another electronic device of the same account or group or the server 607. The server 607, which has received the second OOB data from the first external electronic device 601 may transmit the received second OOB authentication data to electronic devices of the same account or group to which the second OOB data is available.

Figure 9:
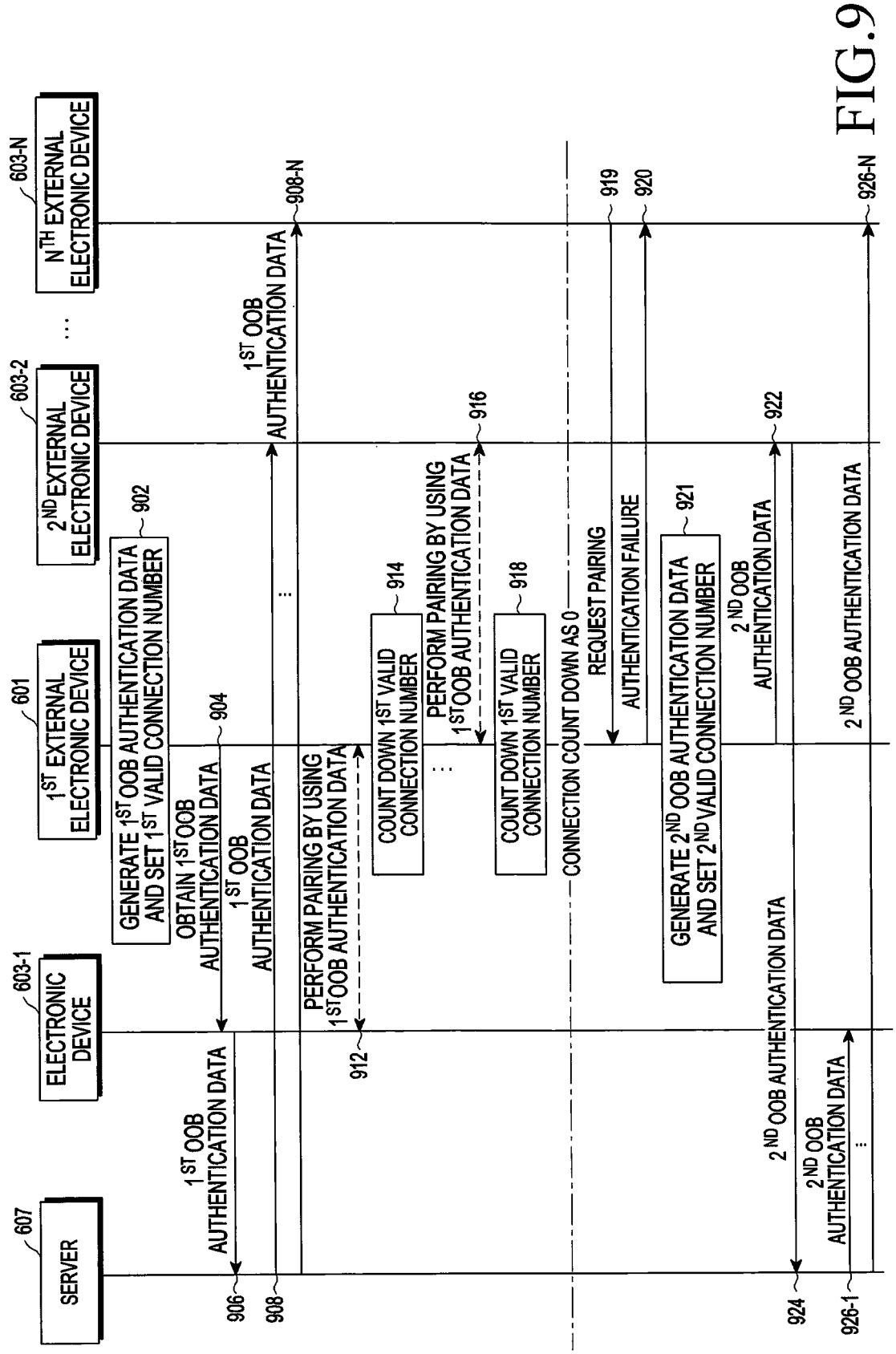
FIG. 9 is a diagram illustrating a signal flow for operations of an electronic device, first to $N^{th}$ external electronic devices, and a server, based on a valid connection number set for OOB authentication data according to various embodiments.

FIG. 9 is a diagram illustrating a signal flow for operations of an electronic device, first to $N^{th}$ external electronic devices, and a server, based on a valid connection number set for OOB authentication data according to various embodiments.

Referring to FIG. 9, the first external electronic device 601 may generate first OOB authentication data related to the first external electronic device 601 and set a first valid connection number for the generated first OOB authentication data in operation 902. According to various embodiments, the first valid connection number may be the number of times a connection is allowed to be established with the first external electronic device 601 based on the first OOB authentication data. According to various embodiments, the first external electronic device 601 may store the first valid connection number for the first OOB authentication data. According to various embodiments, the first OOB authentication data may be configured to be sharable to the electronic device 603-1 and the second to $N^{th}$ external electronic devices 603-2 to 603-N which belong to a first group (or account) (e.g., the first group 60 in FIG. 6) and usable as many times as the first valid connection number in the electronic device 603-1 and the second to $N^{th}$ external electronic devices 603-2 to 603-N which belong to the first group (or account). According to an embodiment, the first OOB authentication data may include a first ID being the ID of the first external electronic device 601, a random value selected by the first external electronic device 601, and a confirm value obtained by applying a predetermined function to the selected random value and a public key. According to various embodiments, the first OOB authentication data may further include the second ID identifying the group or the account. According to various embodiments, the first OOB authentication data related to the first external electronic device 601 may be generated, when an electronic device of the first group (or account) is initially connected to the first external electronic device 601. According to various embodiments, the valid connection number of the first OOB authentication data may be set, when or after the first OOB authentication data is generated. According to an embodiment, the valid connection number of the first OOB authentication data may be set at a time when the first OOB authentication data is generated and then transmitted to any of the electronic device 603-1 and the second to $N^{th}$ external electronic devices 603-2 to 603-N which belong to the first group (or account). According to an embodiment, the valid connection number of the first OOB authentication data may be set to be different for the electronic device 603-1 and the second to $N^{th}$ external electronic devices 603-2 to 603-N which belong to the first group (or account). According to an embodiment, the valid connection number of the first OOB authentication data may be set to be different for the electronic device 603-1 and the second to $N^{th}$ external electronic devices 603-2 to 603-N which belong to the first group (or account) according to the connection frequencies of the electronic device 603-1 and the second to $N^{th}$ external electronic devices 603-2 to 603-N.

In operation 904, the electronic device 603-1 may obtain the first OOB authentication data from the first external electronic device 601. According to various embodiments, the electronic device 603-1 may obtain the first OOB authentication data via a connection to the first external electronic device 601 in various communication schemes. The various communication schemes may include a Bluetooth scheme and an OOB scheme. The Bluetooth scheme may include classic Bluetooth (before BLE) and BLE. The OOB scheme may be any scheme that enables short-range data exchange, such as NFC, camera-based QR code recognition, WiFi Direct, sound-based communication, or light-based communication.

In operation 906, the electronic device 603-1 may transmit the first OOB authentication data related to the first external electronic device 601 to the server 607. According to an embodiment, the first OOB authentication data may include the first ID being the ID of the first external electronic device 601. According to an embodiment, the ID of the first external electronic device 601 may include the Bluetooth MAC address of the first external electronic device 601 or the IRK related to the BLE random address. According to various embodiments, the first ID may include the device ID of the first external electronic device 601. As far as it identifies the first external electronic device 601 such as information included in the GATT of the first external electronic device 601, any information may be used. According to an embodiment, the first OOB authentication data may further include the second ID identifying the group or the account.

The server 607 may identify the first group (or the first account) to which the electronic device 603-1 belongs by the first ID and store (or register) the received first OOB authentication data in relation to the first group.

In operations 908-1 to 908-N, the server 607 may transmit the first OOB authentication data to each of the second to $N^{th}$ external electronic devices 603-2 to 603-N of the first group. According to an embodiment, the first ID may be transmitted in the first OOB authentication data or separately from the first OOB authentication data. According to various embodiments, the server 607 may provide the first OOB authentication data to each of the second to $N^{th}$ external electronic devices 603-2 to 603-N of the first group upon request or by a push message.

According to an embodiment, the first external electronic device 601 may broadcast an advertising packet including the first ID. For example, the first external electronic device 601 may broadcast the advertising packet including the first ID such that the electronic device 603-1 and the second to $N^{th}$ external electronic devices 603-2 to 603-N of the first group 60 may search for the first external electronic device 601. According to an embodiment, the advertising packet may further include the second ID identifying the group or account.

In operations 912 and 916, each of the electronic device 603-1 and the second to $N^{th}$ external electronic devices 603-2 to 603-N (hereinafter, "the electronic device 603-1" and "the second external electronic device 603-2" will be taken as an example) may search for the first external electronic device 601 by the first ID. According to an embodiment, each of the electronic device 601 and the second external electronic device 603-2 may request pairing for authentication to the discovered first external electronic device 601, receive a pairing response from the first external electronic device 601, and perform pairing with the first external electronic device 601 by using the received first OOB authentication data, without performing all or a part of the public key exchange operation, the random value selection operation, the operation of obtaining a confirm value by using a selected random value and a public key, and the confirm value check operation (or a confirm check operation of a user) because there is the received first OOB authentication data. Like the second external electronic device 603-2, each of the other electronic devices of the first group may also perform pairing with the first external electronic device 601 by using the received first OOB authentication data.

The first external electronic device 601 may count down the first valid connection number in operations 914 and 918. According to various embodiments, after the first external electronic device 601 performs pairing by using the first OOB authentication data, the first external electronic device 601 may count down the valid connection number by 1 each time. The valid connection number may be counted down until it reaches 0.

For example, as in operation 919, with the valid connection number counted down to 0, the first external electronic device 601 may receive a pairing request from one (e.g., the $N^{th}$ external electronic device 603-N) of the electronic device 603-1 and the second to $N^{th}$ external electronic devices 603-2 to 603-N. The first external electronic device 601 may check the connection countdown upon receipt of the pairing request. When the first external electronic device 601 identifies the connection countdown as 0, the first external electronic device 601 may perform an authentication failure process in operation 920. According to an embodiment, when the connection countdown reaches 0 while the first external electronic device 601 is performing pairing according to the pairing request from the $N^{th}$ external electronic device 603-N, the first external electronic device 601 may transmit a fail signal to the $N^{th}$ external electronic device 603-N.

If the authentication has been processed as failure due to the connection countdown reaching 0, the first external electronic device 601 may generate second OOB authentication data and set a second valid connection number for the generated second OOB authentication data in operation 921. According to various embodiments, the first external electronic device 601 may set the second valid connection number for the generated second OOB authentication data. For example, the second valid connection number may be the number of times a connection is allowed to be established by using the second OOB authentication data. According to various embodiments, the first external electronic device 601 may store the second valid connection number for the second OOB authentication data.

In operation 922, the first external electronic device 601 may transmit the second OOB authentication data to the second external electronic device 603-2. According to various embodiments, the first external electronic device 601 may transmit the second OOB authentication data to an electronic device (e.g., the second external electronic device 603-2) which was paired before a connection countdown reaches 0. According to an embodiment, the first external electronic device 601 may transmit the second OOB authentication data for which the second valid connection number has been set, to an electronic device (e.g., the electronic device 603-1) which was initially paired with the first external electronic device 601.

In operation 924, the second external electronic device 603-2 may transmit the second OOB authentication data to the server 607. According to an embodiment, the second OOB authentication data may include the first ID. According to an embodiment, the first ID may include the Bluetooth MAC address of the first external electronic device 601 or the IRK related to the BLE random address. According to an embodiment, the second OOB authentication data may further include the second ID identifying the group or the account.

The server 607 may identify the first group (or the first account) to which the electronic device (the second external electronic device 603-2) belongs by the first ID, update the first OOB authentication data prestored (or pre-registered) in relation to the first group to the received second OOB authentication data, and store (or register) the updated second OOB authentication data.

In operations 926-1 to 926-N, the server 607 may provide the first ID and the second OOB authentication data to each of the at least one electronic device 603-1 to 603-N of the first group. According to an embodiment, the first ID may be transmitted in the second OOB authentication data or separately from the second OOB authentication data. According to various embodiments, the server 607 may provide the second OOB authentication data to each of the electronic device 603-1 and the second to $N^{th}$ external electronic devices 603-2 to 603-N of the first group, upon request or by a push message. According to various embodiments, each of the electronic device 603-1 and the second to $N^{th}$ external electronic devices 603-2 to 603-N may perform pairing with the first external electronic device 601 by using the second OOB authentication data.

According to various embodiments, an electronic device (e.g., the electronic device 101 in FIG. 1, the electronic device 201 in FIG. 2, the electronic device 403 in FIG. 4, the electronic device 603-1 in FIG. 6, or an electronic device 1001 in FIG. 10) may include a first wireless communication circuit (e.g., a Bluetooth communication module 1012) supporting a Bluetooth protocol, a second wireless communication circuit (e.g., a cellular communication module 1014) supporting a cellular wireless protocol, a third wireless communication circuit (e.g., an NFC communication module 1016) supporting NFC, a fourth wireless communication circuit (e.g., a WiFi communication module 1018) supporting a WiFi protocol, a camera (e.g., a camera module 1020) exposed through a second part of a housing, a processor (e.g., a processor 1010) disposed inside the housing and electrically coupled to a display, the first wireless communication circuit, the second wireless communication circuit, the third wireless communication circuit, the fourth wireless communication circuit, and the camera, and a memory (e.g., a memory 1022) disposed inside the housing and electrically coupled to the processor. The memory may store instructions which, when executed, cause the processor to obtain information related to authentication for Bluetooth protocol-based pairing with a first external electronic device (e.g., the first external electronic device 401 in FIG. 4 or 601 in FIG. 6) by using one of the third wireless communication circuit and the camera, to perform pairing with the first external electronic device based on at least part of the information by using the first wireless communication circuit, and to transmit the at least part of the information to a second external electronic device (e.g., the second external electronic device 405 in FIG. 4 or 603-2 in FIG. 6) or a server (e.g., the server 607 in FIG. 6) by using the second wireless communication circuit or the fourth wireless communication circuit.

According to an embodiment, the memory may further store instructions which, when executed, cause the processor to access the server by using an account related to the electronic device and provide the at least part of the information by using the account.

According to an embodiment, the at least part of the information may include OOB data defined in a Bluetooth standard and an ID related to the first external electronic device.

According to an embodiment, the ID may include a Bluetooth MAC address or an IRK.

According to an embodiment, a valid duration related to the information may be set, and the valid duration may be a time period during which pairing with the first external electronic device is allowed to be performed by using the information.

According to an embodiment, a connection number related to the information may be set, and the connection number may be the number of times a connection is allowed to be established through pairing with the first external electronic device by using the information.

According to an embodiment, the electronic device (e.g., as a second external electronic device, 405 in FIG. 4, 603-2 in FIG. 6, or 1001 in FIG. 10) may include a housing, a touch screen display exposed through a first part of the housing, a first wireless communication circuit (e.g., the Bluetooth communication module 1012) supporting a Bluetooth protocol, a second wireless communication circuit (e.g., the cellular communication module 1014) supporting a cellular wireless protocol, a third wireless communication circuit (e.g., the NFC communication module 1016) supporting NFC, a fourth wireless communication circuit (e.g., the WiFi communication module 1018) supporting a WiFi protocol, a camera (e.g., the camera module 1020) exposed through a second part of the housing, a processor (e.g., the processor 1010) disposed inside the housing and electrically coupled to the display, the first wireless communication circuit, the second wireless communication circuit, the third wireless communication circuit, the fourth wireless communication circuit, and the camera, and a memory (e.g., the memory 1022) disposed inside the housing and electrically coupled to the processor. The memory may store instructions which, when executed, cause the processor to connect the electronic device communicably to a server (e.g., the server 607 in FIG. 6) or a second external electronic device (e.g., the electronic device 403 in FIG. 4 or the electronic device 603-1 in FIG. 6) by using an account related to the electronic device through the second wireless communication circuit or the fourth wireless communication circuit, to receive information related to authentication for pairing with a first external electronic device (e.g., the first external electronic device 401 in FIG. 4 or the first external electronic device 601 in FIG. 6) based on a Bluetooth protocol from the server or the second external electronic device through the second wireless communication circuit or the fourth wireless communication circuit, and to perform pairing with the first external electronic device based on at least part of the information by using the first wireless communication circuit.

Figure 10:
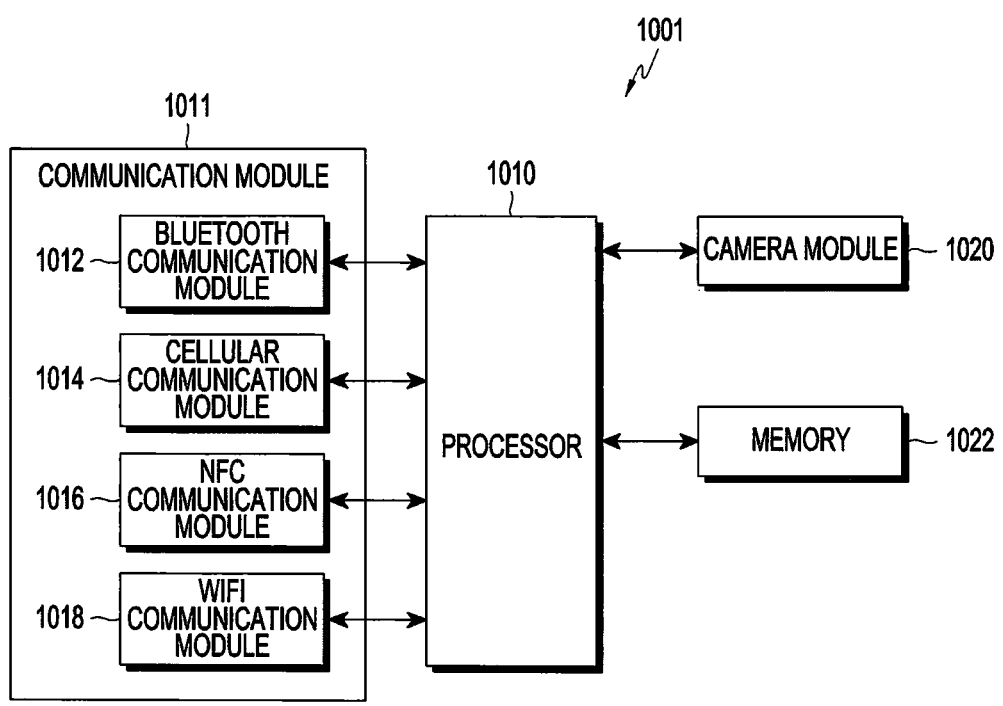
FIG. 10 is a block diagram of an electronic device according to various embodiments.

FIG. 10 is a block diagram illustrating an electronic device according to various embodiments.

According to an embodiment, the electronic device 1001 may include, for example, the whole or part of the electronic device 101 of FIG. 1 or the electronic device 201 of FIG. 2.

Referring to FIG. 10, the electronic device 1001 according to an embodiment may execute the functions of an electronic device (e.g., the electronic device 403 or the electronic device 603-1) or the functions of a second external electronic device (e.g., the second external electronic device 405 or the second external electronic device 603-2) according to various embodiments. According to an embodiment, the electronic device 1001 may include the processor 1010, the communication module 1011, the camera module 1020, and the memory 1022.

The communication module 1011 may include, for example, the whole or part of the communication interface 170 of FIG. 1 or the communication module 220 of FIG. 2. According to an embodiment, the communication module 1011 may include the Bluetooth communication module 1012, the cellular communication module 1014, the NFC communication module 1016, and the WiFi communication module 1018.

The Bluetooth communication module 1012 may support a Bluetooth protocol, and the Bluetooth protocol may include a BLE protocol. The Bluetooth communication module 1012 may transmit and receive Bluetooth-based or BLE-based data. According to an embodiment, the Bluetooth communication module 1012 may perform pairing with the first external electronic device (e.g., 401 or 601) by at least one of Bluetooth or BLE.

The cellular communication module 1014 may support a cellular communication protocol and transmit and receive data based on the cellular communication protocol. The WiFi communication module 1018 may support a WiFi communication protocol and transmit and receive data based on the WiFi communication protocol. At least one of the cellular communication module or the WiFi communication module 1018 may transmit OOB authentication data related to a first external electronic device to an external electronic device or a server or receive the OOB authentication data related to the first external electronic device from an external electronic device or the server.

The NFC communication module 1016 may support an NFC communication protocol and transmit and receive data based on the NFC communication protocol. According to an embodiment, the NFC communication module 1016 may receive OOB authentication data through NFC tagging.

The camera module 1020 is a device capable of capturing a still image and a video, which may capture an object (e.g., a QR code or the like) including OOB authentication data and provide the captured object image including the OOB authentication data.

The processor 1010 (e.g., the processor 120) may provide overall control to the electronic device 1001. The processor 1010 may include one or more of a CPU, an AP, or a CP. The processor 120 may, for example, execute computation or data processing related to control and/or communication of at least one other component of the electronic device 101.

According to various embodiments, when executing the functions of the electronic device (e.g., the electronic device 403 or the electronic device 603-1), the processor 1010 may control acquisition of first OOB authentication data related to the first external electronic device (e.g., the first external electronic device 401 of FIG. 4 or the first external electronic device 601 of FIG. 6), and transmission of the acquired first OOB authentication data to the second external electronic device (e.g., the second external electronic device 405 of FIG. 4 or the second external electronic device 603-2 of FIG. 6) or the server (e.g., the server 607 of FIG. 6). For example, the first OOB authentication data may include a first ID. According to various embodiments, the second external electronic device may be an electronic device belonging to the group or account of the electronic device 1001. According to various embodiments, the server may be a server which may be connected to an electronic device belonging to the group or account of the electronic device 1001.

According to various embodiments, the processor 1010 may further transmit the first ID related to the obtained first OOB authentication data separately from the first OOB authentication data to the second external electronic device or the server. According to an embodiment, the first ID may include an ID of the first external electronic device. According to an embodiment, the first OOB authentication data may further include a second ID identifying the group or the account, or the processor 1010 may further transmit the second ID related to the obtained first OOB authentication data separately from the first OOB authentication data to the second external electronic device or the server.

According to various embodiments, when the processor 1010 executes the functions of the second external electronic device (e.g., the second external electronic device 405 or the second external electronic device 603-2), as the processor 1010 receives the first OOB authentication data related to the first external electronic device (401 in FIG. 4 or 601 in FIG. 6) from the server (e.g., the server 607 in FIG. 6) or the electronic device (e.g., 403 in FIG. 4 or 603-1 in FIG. 6), the processor 1010 may control discovery of the first external electronic device by the first ID, and pairing with the discovered first external electronic device by using the first OOB authentication data.

The memory 1022 (e.g., the memory 130) may include a volatile memory and/or a non-volatile memory. The memory 1022 may store, for example, commands or data related to at least one other component of the electronic device 1001. According to an embodiment, the memory 1022 may store software and/or programs. According to an embodiment, the memory 1022 may store instructions which cause the processor 1010 to obtain the first OOB authentication data related to the first external electronic device (e.g., 401 in FIG. 4 or 601 in FIG. 6) and transmit the obtained first OOB authentication data to the second external electronic device (e.g., 405 in FIG. 4 or 601 in FIG. 6) or the server (e.g., 607). According to an embodiment, the memory 1022 may store instructions which cause the processor 1010 to, as the first OOB authentication data related to the first external electronic device (401 in FIG. 4 or 601 in FIG. 6) is received from the server (e.g., the server 607 in FIG. 6) or the second external electronic device (e.g., 403 in FIG. 4 or 603-1 in FIG. 6), search for the first external electronic device by the first ID and perform pairing with the discovered external electronic device by using the first OOB authentication data.

According to various embodiments, a method of transmitting authentication information in an electronic device (e.g., 101 in FIG. 1, 201 in FIG. 2, 403 in FIG. 4, or 603-1 in FIG. 6) may include obtaining information related to authentication for pairing based on a Bluetooth protocol with a first external electronic device (e.g., 401 in FIG. 4 or 601 in FIG. 6), performing pairing with the first external electronic device based on at least part of the information, and transmitting the at least part of the information to a second external electronic device (e.g., 405 in FIG. 4 or 603-2 in FIG. 6) or a server (e.g., 607 in FIG. 6) to enable the second external electronic device to perform pairing based on the Bluetooth protocol with the first external electronic device by using the at least part of the information.

According to an embodiment, the obtaining of information may include obtaining the information related to authentication for pairing based on the Bluetooth protocol with the first external electronic device by one of NFC communication and a camera, and the transmission of at least part of the information may include transmitting the at least part of the information to the second external electronic device or the server by cellular communication or WiFi communication.

According to an embodiment, the method may further include accessing the server by using an account related to the electronic device and providing the at least part of the information by using the account.

According to an embodiment, the at least part of the information may include OOB data defined in a Bluetooth standard and an ID related to the first external electronic device.

According to an embodiment, the ID may include a Bluetooth MAC address or an IRK.

Figure 11:
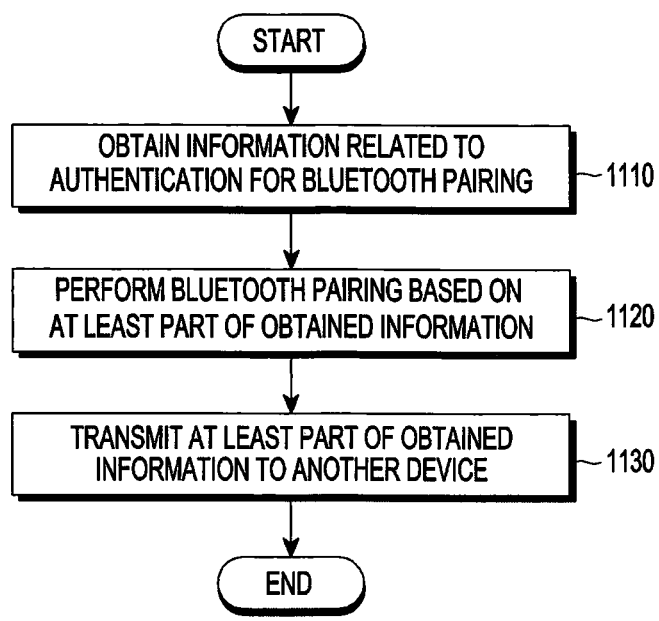
FIG. 11 is a flowchart illustrating an operation of transmitting OOB authentication data in an electronic device according to various embodiments.

FIG. 11 is a flowchart illustrating an operation of transmitting OOB authentication data by an electronic device according to various embodiments.

Referring to FIG. 11, according to an embodiment, an electronic device may include the whole or part of, for example, the electronic device 101 of FIG. 1, the electronic device 201 of FIG. 2, or the electronic device 1001 of FIG. 10.

According to an embodiment, the electronic device (e.g., 403 in FIG. 4 or 603-1 in FIG. 6) may obtain authentication-related information for Bluetooth pairing in operation 1110. According to an embodiment, the electronic device may obtain authentication-related information for Bluetooth protocol-based pairing with a first external electronic device (e.g., 401 in FIG. 4 or 601 in FIG. 6). For example, the authentication-related information for Bluetooth protocol-based pairing may include first OOB authentication data.

According to various embodiments, the electronic device may obtain the first OOB authentication data in various communication schemes. The various communication schemes may include a Bluetooth scheme and an OOB scheme. The Bluetooth scheme may include classic Bluetooth (before BLE) and BLE.

According to an embodiment, when Bluetooth or BLE is used, the electronic device may search for a first external electronic device by scanning, establish a Bluetooth or BLE connection with the discovered first external electronic device, check whether the first external electronic device supports an OOB authentication data sharing service, and then obtain OOB authentication data related to the first external electronic device. According to an embodiment, when the electronic device establishes a Bluetooth connection, the electronic device may identify whether the first external electronic device supports the OOB authentication data sharing service by, for example, an SPP profile or a predetermined profile for the OOB authentication data sharing service. According to various embodiments, when the electronic device establishes a BLE connection, the electronic device may determine whether the first external electronic device supports the OOB authentication data sharing service through an attribute having a transmission and reception property in a GATT or by detecting preset OOB authentication data sharing-related service and characteristics in the GATT.

According to an embodiment, if an OOB-based connection scheme is used, the electronic device may obtain the OOB authentication data related to the first external electronic device through NFC tagging, camera-based QR code recognition, WiFi Direct communication, recognition of sound received through a microphone, or analysis of light received through a light receiving device.

In operation 1120, the electronic device may perform Bluetooth pairing based on at least part of the obtained information. According to an embodiment, the electronic device may perform Bluetooth pairing with the first external electronic device (e.g., 401 in FIG. 4 or 601 in FIG. 6) based on the at least part of the obtained information. According to an embodiment, the electronic device may perform pairing with the first external electronic device by using first OOB authentication data.

In operation 1130, the electronic device may transmit the at least part of the obtained information to another device. According to an embodiment, the electronic device may transmit the at least part of the obtained information to a second external electronic device (e.g., 405 in FIG. 4 or 603-2 in FIG. 6) or a server (e.g., 607 in FIG. 6) such that the second external electronic device may perform pairing with the first external electronic device.

According to an embodiment, the electronic device, which has been paired with the first external electronic device, may transmit the at least part of the obtained information to the second external electronic device or the server. Without being paired with the first external electronic device, the electronic device may transmit the at least part of the obtained information to the second external electronic device or the server.

According to various embodiments, the electronic device may determine whether to transmit the first OOB authentication data of the obtained information to the second external electronic device (e.g., 405 in FIG. 4 or 603-2 in FIG. 6). For example, if at least one second external electronic device belongs to the same account, the electronic device may determine whether to share the first OOB authentication data with the at least one second external electronic device. According to an embodiment, the electronic device may determine whether to transmit the first OOB authentication data to the server (e.g., 607 in FIG. 6) or the second external electronic device. For example, the second external electronic device may be another electronic device belonging to the group or account of the electronic device. According to an embodiment, the server may be a server that may be connected to at least one electronic device of the group or account of the electronic device.

According to an embodiment, the electronic device may upload a first ID and first OOB authentication data which are related to the first external electronic device. According to an embodiment, the electronic device may transmit the first ID and the first OOB authentication data related to the first external electronic device to the second external electronic device. According to various embodiments, the first ID may include an ID of the first external electronic device. For example, the ID of the first external electronic device may include a Bluetooth MAC address of the first external electronic device or an IRK related to a BLE random address. According to various embodiments, the first ID may include a device ID of the first external electronic device, and as far as it identifies the first external electronic device such as information included in the GATT of the first external electronic device, any information is available. According to an embodiment, the first OOB authentication data may further include a second ID identifying the group or the account.

Figure 12:
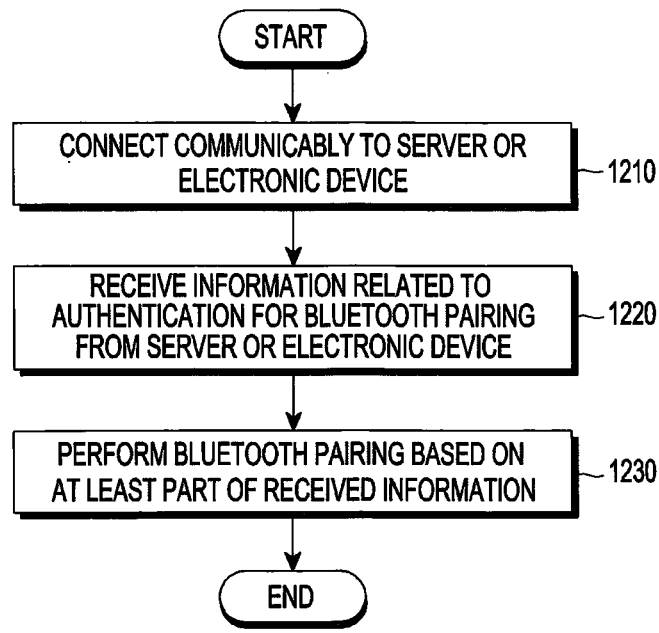
FIG. 12 is a flowchart illustrating an operation of receiving and using OOB authentication data in an electronic device according to various embodiments.

FIG. 12 is a flowchart illustrating an operation of receiving and using OOB authentication data by an electronic device according to various embodiments.

Referring to FIG. 12, the electronic device according to an embodiment may include the whole or part of, for example, the electronic device 101 of FIG. 1, the electronic device 201 of FIG. 2, or the electronic device 1001 of FIG. 10. For example, the electronic device may be an electronic device executing the functions of a second external electronic device (e.g., the second external electronic device 405 or the second external electronic device 603-2). The following description is given with the appreciation that the electronic device is a second external electronic device (e.g., the second external electronic device 405 or the second external electronic device 603-2), by way of example.

In operation 1210, the second external electronic device (e.g., 405 in FIG. 4 or 603-2 in FIG. 6) may be connected communicably to a server (e.g., 607 in FIG. 6) or an electronic device (e.g., 403 in FIG. 4 or 603-1 in FIG. 6). According to an embodiment, the second external electronic device may be connected communicably to the server (e.g., 607 in FIG. 6) or the electronic device (e.g., 403 in FIG. 4 or 603-1 in FIG. 6) by using an account related to the electronic device through a wireless communication circuit (e.g., the communication interface 170 of FIG. 1, the communication module 222 of FIG. 2, or the communication module 1011 of FIG. 10). According to an embodiment, the electronic device may be connected communicably to the server or the electronic device by using an account related to the electronic device through cellular communication or WiFi communication.

In operation 1220, the second external electronic device may receive information related to authentication for Bluetooth pairing from the server or the electronic device. According to an embodiment, the second external electronic device may receive information related to authentication for Bluetooth pairing from the server or the electronic device through a wireless communication circuit. According to an embodiment, the authentication-related information may be received by cellular communication or WiFi communication and include first OOB authentication data. According to an embodiment, the first OOB authentication data may include a first ID. The first ID may include a Bluetooth MAC address of the first external electronic device or an IRK related to a BLE random address. According to various embodiments, the first ID may include a device ID of the first external electronic device, and as far as it identifies the first external electronic device such as information included in the GATT of the first external electronic device, any information is available. According to an embodiment, the first OOB authentication data may further include a second ID identifying a group or an account.

In operation 1230, the second external electronic device may perform Bluetooth pairing based on part of the received information. According to an embodiment, the second external electronic device may perform Bluetooth pairing with the first external electronic device (e.g., 401 in FIG. 4 or 601 in FIG. 6) based on the part of the received information. According to various embodiments, the second external electronic device may search for the first external electronic device by the first ID during Bluetooth pairing. According to an embodiment, the second external electronic device may receive an advertising packet including the first ID broadcast from the first external electronic device and search for the first external electronic device by using the first ID. For example, the second external electronic device may search for the first external electronic device by comparing the first ID included in the received advertising packet with a first ID received from the electronic device. Once the second external electronic device discovers the first external electronic device, the second external electronic device may perform pairing with the first external electronic device by using the received first OOB authentication data. According to an embodiment, the second external electronic device may request pairing for authentication to the discovered first external electronic device, receive a paring response from the first external electronic device, and perform pairing with the first external electronic device by using the received OOB authentication data, without performing all or a part of a public key exchange operation, a random value selection operation, an operation of obtaining a confirm value by using a selected random value and a public key, and a confirm value check operation (or a confirm check operation of a user) because there is the received OOB authentication data. According to an embodiment, the second external electronic device may periodically search for another external electronic device or upon receipt of an advertising packet and compare first IDs.

According to various embodiments, a method of receiving authentication information in an electronic device may include connecting communicably to a server or a second external electronic device by using an account related to the electronic device through a wireless communication circuit, receiving information related to authentication for pairing based on a Bluetooth protocol with a first external electronic device from the server or the second external electronic device through the wireless communication circuit, and performing Bluetooth pairing with the first external electronic device based on at least part of the information.

According to an embodiment, the connecting may include connecting communicably to the server or the second external electronic device by the account related to the electronic device through cellular communication or WiFi communication, and the reception of information may include receiving the information related to authentication for pairing based on the Bluetooth protocol with the first external electronic device from the server or the second external electronic device through cellular communication or WiFi communication, and the performing of pairing may include performing pairing with the first external electronic device based on the at least part of the information through Bluetooth pairing.

According to an embodiment, the at least part of the information may include OOB data defined in a Bluetooth standard and an ID related to the first external electronic device.

According to an embodiment, the ID may include a Bluetooth MAC address or an IRK.

Each of the above-described components may include a single entity or multiple entities, and may be named differently according to the type of an electronic device. According to various embodiments, one or more of the above-described components may be omitted, or one or more other components may be added in the electronic device. Further, a plurality of components (e.g., modules or programs) may be integrated into a single entity. In such a case, the integrated entity may still perform one or more functions of each of the plurality of components in the same or similar manner as they are performed by a corresponding one of the plurality of components before the integration.

As used herein, the term "module" may include a unit implemented in hardware, software, or firmware, and may interchangeably be used with other terms, for example, unit, logic, logical block, component, or circuit. A "module" may be the smallest unit of an integrated part or a portion thereof. A "module" may be the smallest unit for performing one or more functions, or a portion thereof. A "module" may be implemented mechanically or electronically. For example, a "module" may include at least one of a known, or to-be-developed, application-specific integrated circuit (ASIC) chip, field-programmable gate arrays (FPGAs), or programmable logic devices that perform certain operations.

At least a part of apparatuses (e.g., modules or their functions) or methods (e.g., operations) according to various embodiments may be implemented as instructions stored in a computer-readable storage medium in the form of a programming module. When the instructions are executed by at least one processor (e.g., the processor 120), the at least one processor may execute functions corresponding to the instructions. The computer-readable medium may include, for example, the memory 130.

According to various embodiments, a storage medium stores an authentication information transmission program. The program in an electronic device may perform obtaining information related to authentication for pairing based on a Bluetooth protocol with a first external electronic device by one of NFC communication and a camera, performing pairing with the first external electronic device based on at least part of the information by Bluetooth communication, and transmitting the at least part of the information to a second external electronic device or a server by cellular communication or WiFi communication.

According to various embodiments, a storage medium stores an authentication information reception program. The program in an electronic device may perform connecting the electronic device communicably to a server or a second external electronic device by using an account related to the electronic device by cellular communication or WiFi communication, receiving information related to authentication for pairing based on a Bluetooth protocol with a first external electronic device from the server or the first external electronic device by cellular communication or NFC communication, and performing Bluetooth pairing with the first external electronic device based on at least part of the information by Bluetooth communication.

The computer-readable recording medium may include a hard disk, floppy disk, magnetic media (e.g., magnetic tape), optical media (e.g., compact disc read-only memory (CD-ROM), a digital versatile disc (DVD), magneto-optical media (e.g., floptical disk), a hardware device (e.g., read only memory (ROM) or a random access memory (RAM)), a flash memory, and the like. Program instructions may include machine language code that is produced by a compiler or high-level language code that may be executed by an interpreter. The above-described hardware device may be configured to operate as one or more software modules in order to perform operations according to various embodiments, and vice versa.

A module or a programming module according to various embodiments may include one or more of the above-described components, may omit a portion thereof, or may include additional components. Operations that are performed by a module, a programming module or other components according to various embodiments may be processed in a serial, parallel, repetitive, or heuristic manner. Also, some operations may be performed in a different order or omitted, or additional operations may be added.

While the disclosure has been described with reference to the particular embodiments, it is clear to those skilled in the art that many modifications can be made without departing from the scope and spirit of the disclosure.

The invention claimed is:

1. An electronic device comprising:
a housing;
a touch screen display exposed through a first part of the housing;
a first wireless communication circuit supporting a Bluetooth protocol;
a second wireless communication circuit supporting a cellular wireless protocol;
a third wireless communication circuit supporting near field communication (NFC);
a fourth wireless communication circuit supporting a wireless fidelity (WiFi) protocol;
a camera exposed through a second part of the housing;
a processor disposed inside the housing, and electrically coupled to the display, the first wireless communication circuit, the second wireless communication circuit, the third wireless communication circuit, the fourth wireless communication circuit, and the camera; and
a memory disposed inside the housing and electrically coupled to the processor,
wherein the memory stores instructions which, when executed, cause the processor to:
obtain first information related to authentication for pairing based on the Bluetooth protocol with a first external electronic device by using the third
wireless communication circuit or the camera,
perform Bluetooth pairing with the first external electronic device based on at least part of the first information by using the first wireless communication circuit,
identify whether the first external electronic device is provided with an out of band (OOB) authentication data sharing service based on second information received from the first external electronic device while pairing with the first external electronic device; and
based on providing the OOB authentication data sharing service of the first external electronic device, transmit the at least part of the first information to a second external electronic device or a server by using the second wireless communication circuit or the fourth wireless communication circuit.

2. The electronic device of claim 1, wherein the memory further stores instructions which, when executed, cause the processor to access the server by using an account related to the electronic device, and to provide the at least part of the first information by using the account.

3. The electronic device of claim 2, wherein the at least part of the first information includes OOB data defined in a Bluetooth standard and an identifier (ID) related to the first external electronic device.

4. The electronic device of claim 3, wherein the ID includes a Bluetooth medium access control (MAC) address or an identity resolving key (IRK).

5. The electronic device of claim 1, wherein a valid duration related to the first information is set, and
wherein the valid duration is a time period during which pairing with the first external electronic device is allowed to be performed by using the first information.

6. The electronic device of claim 1, wherein a connection number related to the first information is set, and
wherein the connection number is the number of times a connection is allowed to be established through pairing with the first external electronic device by using the first information.

7. An electronic device comprising:
a housing;
a touch screen display exposed through a first part of the housing;
a first wireless communication circuit supporting a Bluetooth protocol;
a second wireless communication circuit supporting a cellular wireless protocol;
a third wireless communication circuit supporting near field communication (NFC);
a fourth wireless communication circuit supporting a wireless fidelity (WiFi) protocol;
a camera exposed through a second part of the housing;
a processor disposed inside the housing, and electrically coupled to the display, the first wireless communication circuit, the second wireless communication circuit, the third wireless communication circuit, the fourth wireless communication circuit, and the camera; and a memory disposed inside the housing and electrically coupled to the processor, wherein the memory stores instructions which, when executed, cause the processor to connect the electronic device communicably to a server or a second external electronic device through the second wireless communication circuit or the fourth wireless communication circuit by using an account related to the electronic device, to receive information related to authentication for pairing based on the Bluetooth protocol with a first external electronic device from the server or the second external electronic device through the second wireless communication circuit or the fourth wireless communication circuit, and to perform pairing with the first external electronic device based on at least part of the information by using the first wireless communication circuit, wherein the information includes data associated with an out of band (OOB) authentication data sharing service and OOB data defined in a Bluetooth standard.

8. The electronic device of claim 7, wherein the at least part of the information includes an identifier (ID) related to the first external electronic device, and the ID includes a Bluetooth medium access control (MAC) address or an identity resolving key (IRK).

9. The electronic device of claim 7, wherein a valid duration related to the information is set, and wherein the valid duration is a time period during which pairing with the first external electronic device is allowed to be performed by using the information.

10. The electronic device of claim 7, wherein a connection number related to the information is set, and wherein the connection number is the number of times a connection is allowed to be established through pairing with the first external electronic device by using the information.

11. A method of transmitting authentication information in an electronic device, the method comprising:

obtaining first information related to authentication for pairing based on a Bluetooth protocol with a first external electronic device;

performing Bluetooth pairing with the first external electronic device based on at least part of the first information;

identifying whether an out of band (OOB) authentication data sharing service is provided by the first external electronic device based on second information received from the first external electronic device while pairing with the first external electronic device; and based on providing the OOB authentication data sharing service of the first external electronic device, transmitting the at least part of the information to a second external electronic device or a server to enable the second external electronic device to perform pairing based on the Bluetooth protocol with the first external electronic device by using the at least part of the first information.

12. The method of claim 11, wherein the obtaining of the first information comprises obtaining the first information related to authentication for pairing based on the Bluetooth protocol with the first external electronic device by near field communication (NFC) or a camera, and the transmission of at least part of the first information comprises transmitting the at least part of the first information to the second external electronic device or the server by cellular communication or wireless fidelity (WiFi) communication.

13. The method of claim 11, further comprising:

accessing the server by using an account related to the electronic device; and providing the at least part of the first information by using the account.

14. A method of receiving authentication information in an electronic device, the method comprising:

connecting communicably to a server or a second external electronic device by using an account related to the electronic device through a wireless communication circuit;

receiving information related to authentication for pairing based on a Bluetooth protocol with a first external electronic device from the server or the second external electronic device through the wireless communication circuit; and performing Bluetooth pairing with the first external electronic device based on at least part of the information, wherein the information includes data associated with an out of band (OOB) authentication data sharing service and OOB data defined in a Bluetooth standard.

15. The method of claim 14, wherein the connecting comprises connecting communicably to the server or the second external electronic device by using the account related to the electronic device through cellular communication or wireless fidelity (WiFi) communication, the reception of information comprises receiving the information related to authentication for pairing based on the Bluetooth protocol with the first external electronic device from the server or the second external electronic device through cellular communication or WiFi communication, and the performing of pairing comprises performing pairing with the first external electronic device based on the at least part of the information through Bluetooth pairing.

* * * * *